US011929563B2

(12) United States Patent
Leung et al.

(10) Patent No.: US 11,929,563 B2
(45) Date of Patent: Mar. 12, 2024

(54) COMPACT WIDEBAND LOW-PROFILE DIELECTRIC RESONATOR ANTENNAS

(71) Applicant: City University of Hong Kong, Kowloon (HK)

(72) Inventors: Kwok Wa Leung, Kowloon Tong (HK); Hauke Ingolf Kremer, Kowloon Tong (HK); Wai Ki Lee, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 114 days.

(21) Appl. No.: 17/713,280

(22) Filed: Apr. 5, 2022

(65) Prior Publication Data

US 2023/0318187 A1 Oct. 5, 2023

(51) Int. Cl.

| | |
|---|---|
| ***H01Q 9/04*** | (2006.01) |
| ***H01Q 1/38*** | (2006.01) |
| ***H01Q 13/28*** | (2006.01) |
| ***H01Q 15/10*** | (2006.01) |

(52) U.S. Cl.

CPC ............. *H01Q 9/0485* (2013.01); *H01Q 1/38* (2013.01); *H01Q 9/045* (2013.01); *H01Q 13/28* (2013.01); *H01Q 15/10* (2013.01)

(58) Field of Classification Search

CPC ........ H01Q 9/045; H01Q 9/0485; H01Q 1/38; H01Q 13/28; H01Q 15/10

See application file for complete search history.

(56) References Cited

U.S. PATENT DOCUMENTS

| | | | | |
|---|---|---|---|---|
| 6,147,647 | A | 11/2000 | Tassoudji et al. | |
| 6,344,833 | B1 | 2/2002 | Lin et al. | |
| 8,519,542 | B2 * | 8/2013 | Kim | H01L 23/52 257/774 |
| 9,343,810 | B2 | 5/2016 | Chen et al. | |
| 10,381,735 | B2 * | 8/2019 | Miraftab | H01Q 9/0485 |
| 10,714,823 | B2 | 7/2020 | Balanis et al. | |
| 10,856,408 | B1 * | 12/2020 | Leung | H01Q 9/0485 |

(Continued)

OTHER PUBLICATIONS

S. A. Long, M. McAllister, and L. C. Shen, "The resonant cylindrical dielectric cavity antenna," IEEE Trans. Antennas Propag., vol. 31, No. 3, pp. 406-412, May 1983.

(Continued)

*Primary Examiner* — Hoang V Nguyen
*Assistant Examiner* — Aladdin Abdulbaki
(74) *Attorney, Agent, or Firm* — Renner, Kenner, Greive, Bobak, Taylor & Weber

(57) ABSTRACT

A substrate-integrated dielectric resonator contains a substrate layer with a first dielectric constant, a plurality of dielectric vias, and a plurality of second vias. Each dielectric via includes a first via-hole extending through the substrate layer, and a dielectric material with a second dielectric constant contained within the first via-hole. Each second via has a second via-hole extending through the substrate layer and filled with gas. A dielectric resonator antenna containing a substrate-integrated dielectric resonator and a method of fabricating the same is also disclosed. By skillfully arranging second vias inside the DRA, the resonant frequencies of different modes can be controlled, and a wide impedance band-width with stable radiation performance can be achieved.

15 Claims, 13 Drawing Sheets

(56) References Cited

U.S. PATENT DOCUMENTS

| | | | | |
|---|---|---|---|---|
| 11,670,859 B1 * | 6/2023 | Leung | H01Q 9/0485 343/904 |
| 2011/0248890 A1 * | 10/2011 | Lee | H01Q 9/0485 343/700 |
| 2022/0013915 A1 * | 1/2022 | Han | H01Q 1/243 |

OTHER PUBLICATIONS

A. Petosa, Dielectric resonator antenna handbook. Boston: Artech House, 2007.
K. M. Luk and K. W. Leung, Ed., Dielectric resonator antennas. Baldock: Research Studies Press, 2003.
Y. M. Pan and S. Y. Zheng, "A Low-Profile Stacked Dielectric Resonator Antenna With High-Gain and Wide Bandwidth," IEEE Antennas Wireless Propag. Lett., vol. 15, pp. 68-71, 2016.
X.-Y. Dong, W.-W. Yang, H. Tang, and J.-X. Chen, "Wideband low-profile dielectric resonator antenna with a lattice structure," Electron. Lett., vol. 53, No. 19, pp. 1289-1290, Sep. 2017.
H. W. Lai, K.-M. Luk, and K. W. Leung, "Dense Dielectric Patch Antenna-A New Kind of Low-Profile Antenna Element for Wireless Communications," IEEE Trans. Antennas Propag., vol. 61, No. 8, pp. 4239-4245, Aug. 2013.
S.-C. Tang, X.-Y. Wang, W.-W. Yang, and J.-X. Chen, "Wideband Low-Profile Dielectric Patch Antenna and Array With Anisotropic Property," IEEE Trans. Antennas Propag., vol. 68, No. 5, pp. 4091-4096, May 2020.
Y. Li and K.-M. Luk, "Wideband Perforated Dense Dielectric Patch Antenna Array for Millimeter-Wave Applications," IEEE Trans. Antennas Propag., vol. 63, No. 8, pp. 3780-3786, Aug. 2015.
H. Wu and J. Shi, "A Wideband Dual-Slot Coupled Multiple Dense Dielectric Patch Antenna," IEEE Antennas Wireless Propag. Lett., vol. 19, No. 6, pp. 944-948, Jun. 2020.
X.-Y. Wang, S.-C. Tang, L.-L. Yang, and J.-X. Chen, "Differential-Fed Dual-Polarized Dielectric Patch Antenna With Gain Enhancement Based on Higher Order Modes," IEEE Antennas Wireless Propag. Lett., vol. 19, No. 3, pp. 502-506, Mar. 2020.
X.-Y. Wang, S.-C. Tang, X.-F. Shi, and J.-X. Chen, "A Low-Profile Filtering Antenna Using Slotted Dense Dielectric Patch," IEEE Antennas Wireless Propag. Lett., vol. 18, No. 3, pp. 502-506, Mar. 2019.
H. I. Kremer, K. W. Leung and M. W.K. Lee, "Design of substrate integrated dielectric resonator antenna using dielectric vias," IEEE Trans. Antennas Propag. (available in Early Access of IEEE Xplore).
M. Mrnka, "An Effective Permittivity Tensor of Cylindrically Perforated Dielectrics," IEEE Antennas Wireless Propag. Lett., vol. 17, No. 1, p. 4, 2018.
Chowdhury, R. Kumar, and R. K. Chaudhary, "A new technique to enhance the impedance bandwidth of CDRA using drilling holes," in 2016 11th International Conference on Industrial and Information Systems (ICIIS), Roorkee, India, Dec. 2016, pp. 259-262.
M. W. K. Lee and Y. L. Chow, "Patch Antenna of Dual Polarization with Complementary Feeds:—a design for high isolation between the two ports and a radiation of low cross-polarization from each port," in TENCON 2006-2006 IEEE Region 10 Conference, Hong Kong, Nov. 2006, pp. 1-3.
H. Gajera, D. Guha, and C. Kumar, "New Technique of Dielectric Perturbation in Dielectric Resonator Antenna to Control the Higher Mode Leading to Reduced Cross-Polar Radiations," IEEE Antennas Wireless Propag. Lett., vol. 16, pp. 445-448, 2017.
Q. Li, S. W. Cheung, and C. Zhou, "A Low-Profile Dual-Polarized Patch Antenna With Stable Radiation Pattern Using Ground-Slot Groups and Metallic Ground Wall," IEEE Trans. Antennas Propag., vol. 65, No. 10, pp. 5061-5068, Oct. 2017.
J. Zhang, K. Yang, E. Eide, S. Yan, and G. A. E. Vandenbosch, "Simple Triple-Mode Dual-Polarized Dipole Antenna With Small Frequency Separation Ratio," IEEE Antennas Wireless Propag. Lett., vol. 19, No. 2, pp. 262-266, Feb. 2020.
Y. Zhang, Z. Song, W. Hong, and R. Mittra, "Wideband high-gain ±45° . dual-polarised stacked patch antenna array for Ku-band back-haul services," IET Microw. Antennas Propag., vol. 14, No. 1, pp. 53-59, Jan. 2020.
Shi-Gang Zhou, Peng-Khiang Tan, and Tan-Huat Chio, "Low-Profile, Wideband Dual-Polarized Antenna With High Isolation and Low Cross Polarization," IEEE Antennas Wireless Propag. Lett., vol. 11, pp. 1032-1035, 2012.
H. Zhu, Y. Qiu, and G. Wei, "A Broadband Dual-Polarized Antenna With Low Profile Using Nonuniform Metasurface," IEEE Antennas Wireless Propag. Lett., vol. 18, No. 6, pp. 1134-1138, Jun. 2019.
Design of Substrate-Integrated Dielectric Resonator Antenna With Dielectric Vias. / Kremer, Hauke Ingolf; Leung, Kwok Wa; Lee, Mike W. K. In: IEEE Transactions on Antennas and Propagation, vol. 69, No. 9, Sep. 2021, p. 5205-5214.

* cited by examiner

COMPACT WIDEBAND LOW-PROFILE DIELECTRIC RESONATOR ANTENNAS

FIELD OF INVENTION

This invention relates to resonators and resonator antennas. These may be radiofrequency (RF) devices, and the invention may be applicable to miniaturized antennas.

BACKGROUND OF INVENTION

Dielectric resonator antennas (DRA) have been researched extensively since their first introduction in [1]. Undoubtedly, DRAs possess many favorable properties, such as their ease of excitation, naturally wide bandwidth (e.g., as compared to microstrip patch antennas), and reduced conductive loss at higher frequencies [2], [3]. Compared to other antenna types, such as microstrip patch antennas or printed circuit board (PCB) integrated dipole antennas, DRAs can be considered quite voluminous because of their much higher profile. Thus far, relatively sparse attention has been paid to the design of low-profile DRA.

For the limited studies on low-profile DRAs, the focus has been mainly on developing wideband techniques. For example, a high-gain, low-profile wideband DRA has been presented in [4]. In this design, the radiation pattern was found to be not very stable across the passband. In [5] a wideband, low-profile DRA with a lattice structure has been proposed, but the lattice structure and the employed dielectric materials make it inconvenient for practical applications. Wideband low profile DRAs commonly suffer from large lateral extent, if common low dielectric constant materials with dielectric constants of approximately 10 are utilized. This is a disadvantage over other PCB-based antennas, such as microstrip patch antennas, which feature compact size. Although it is possible to use high dielectric constant materials with dielectric constants of much larger than 10, those materials are quite generally expensive and are not available for standard PCB fabrication.

Another type of low-profile dielectric antenna, which is conceptually similar to DRA and microstrip patch antenna, is the dense dielectric patch antenna (DD patch antenna) [6]. It is a dielectric patch with a high dielectric constant, mounted on a supporting substrate. Its radiation is attributed mainly to the fields at the edge of the patch, similar to a conventional patch antenna. For DD patch antennas, a dielectric constant of much more than 10 is usually employed. DD patch antennas can be designed with wide bandwidths, but at a high fabrication cost and additional manufacturing effort because of their incompatibility with PCB processes due to the need for high dielectric constant materials.

Different kinds of wideband DD patch antennas have been reported in the literature. For example, a wideband DD patch antenna with metallized slots has been reported in [7], with a bandwidth of 20.3%. In [8] a millimeter-wave DD patch antenna has been reported with 23.5% impedance bandwidth, but its structure is relatively complex with a high profile of 0.3λ0 where λ0 is the wavelength in air at the center frequency. Another example is a multi-segment DD patch antenna fed by two slots, as reported in [9]. This design achieves a very wide bandwidth of 80%, but a more complex feeding circuit is needed with large slots, leading to a degradation of the front-to-back-ratio of the antenna. Furthermore, parasitic patches were deployed, giving rise to a large antenna footprint. Other examples include a differentially fed DD patch antenna [10] and a filtering DD patch antenna [11]. Although some of those designs exhibit remarkable bandwidths, at least one of the following two points has been observed:

i. In order to make the antenna compact, the DD patch or DRA material is made of a high dielectric constant material which may not be easily available for standard PCB technology. Therefore, these designs cannot be integrated into the PCB process. This may limit the application range of such designs because it complicates the manufacturing process. Furthermore, some of their main resonators consist of several parts that need to be assembled, reducing the reliability of the design.

ii. Although wide bandwidths have been achieved, other properties (such as stable radiation pattern, footprint and profile of the design, front-to-back ratio, etc.) have been degraded significantly.

Even though many wideband DRA designs exist, they often rely on reshaping all of the three dimensions of the DRA, such as inverted staired DRA, for instance. Thus, these techniques are not applicable for low-profile designs because of the much-reduced thickness of the DRA.

On the other hand, dual polarized antennas possess the advantage of stabilizing communication links by providing two orthogonally polarized communication channels. Using dual polarized antennas, fading effects can be mitigated. In practice however, dual polarized low profile wideband antennas are sparse and not manufacturing friendly. Common approaches typically use suspended antennas such as cross dipoles or patch antennas. By suspending the antennas above the ground plane, the necessary wide bandwidths can be achieved, at the cost of manufacturing complexity and increase of the antenna profile to a value between 0.15-0.25$\lambda_0$, as measured at the center frequency of the antenna. Furthermore, those antennas typically require additional components such as baluns, phase shifters and power dividers in order to function as a dual polarized antenna and achieve high isolation between the two antenna polarizations. In the case of dipole antennas, baluns are required to excite the dipole antenna. For the case of patch antennas, phase shifters may be required for differential port excitation in order to provide high isolation for the two different antenna ports. The mentioned features make these antennas not very attractive for mass production, as well as portable devices. In particular, any additional circuitry adds to the manufacturing cost as well as to the design complexity and contributes to additional antenna losses, which reduce the efficiency of the antenna.

REFERENCES

The following references are referred to throughout this specification, as indicated by the numbered brackets:

[1] S. A. Long, M. McAllister, and L. C. Shen, "The resonant cylindrical dielectric cavity antenna," IEEE Trans. Antennas Propag., vol. 31, no. 3, pp. 406-412, May 1983.

[2] A. Petosa, Dielectric resonator antenna handbook. Boston: Artech House, 2007.

[3] K. M. Luk and K. W. Leung, Ed., Dielectric resonator antennas. Baldock: Research Studies Press, 2003.

[4] Y. M. Pan and S. Y. Zheng, "A Low-Profile Stacked Dielectric Resonator Antenna With High-Gain and Wide Bandwidth," IEEE Antennas Wireless Propag. Lett., vol. 15, pp. 68-71, 2016.

[5] X.-Y. Dong, W.-W. Yang, H. Tang, and J.-X. Chen, "Wideband low-profile dielectric resonator antenna with a lattice structure," Electron. Lett., vol. 53, no. 19, pp. 1289-1290, September 2017.
[6] H. W. Lai, K.-M. Luk, and K. W. Leung, "Dense Dielectric Patch Antenna-A New Kind of Low-Profile Antenna Element for Wireless Communications," IEEE Trans. Antennas Propag., vol. 61, no. 8, pp. 4239-4245, August 2013.
[7] S.-C. Tang, X.-Y. Wang, W.-W. Yang, and J.-X. Chen, "Wideband Low-Profile Dielectric Patch Antenna and Array With Anisotropic Property," IEEE Trans. Antennas Propag., vol. 68, no. 5, pp. 4091-4096, May 2020.
[8] Y. Li and K.-M. Luk, "Wideband Perforated Dense Dielectric Patch Antenna Array for Millimeter-Wave Applications," IEEE Trans. Antennas Propag., vol. 63, no. 8, pp. 3780-3786, August 2015.
[9] H. Wu and J. Shi, "A Wideband Dual-Slot Coupled Multiple Dense Dielectric Patch Antenna," IEEE Antennas Wireless Propag. Lett., vol. 19, no. 6, pp. 944-948, June 2020.
[10] X.-Y. Wang, S.-C. Tang, L.-L. Yang, and J.-X. Chen, "Differential-Fed Dual-Polarized Dielectric Patch Antenna With Gain Enhancement Based on Higher Order Modes," IEEE Antennas Wireless Propag. Lett., vol. 19, no. 3, pp. 502-506, March 2020.
[11] X.-Y. Wang, S.-C. Tang, X.-F. Shi, and J.-X. Chen, "A Low-Profile Filtering Antenna Using Slotted Dense Dielectric Patch," IEEE Antennas Wireless Propag. Lett., vol. 18, no. 3, pp. 502-506, March 2019.
[12] H. I. Kremer, K. W. Leung and M. W. K. Lee, "Design of substrate integrated dielectric resonator antenna using dielectric vias," IEEE Trans. Antennas Propag. (available in Early Access of IEEE Xplore).
[13] M. Mrnka, "An Effective Permittivity Tensor of Cylindrically Perforated Dielectrics," IEEE Antennas Wireless Propag. Lett., vol. 17, no. 1, p. 4, 2018.
[14] R. Chowdhury, R. Kumar, and R. K. Chaudhary, "A new technique to enhance the impedance bandwidth of CDRA using drilling holes," in 2016 11th International Conference on Industrial and Information Systems (ICIIS), Roorkee, India, December 2016, pp. 259-262.
[15] M. W. K. Lee and Y. L. Chow, "Patch Antenna of Dual Polarization with Complementary Feeds: —a design for high isolation between the two ports and a radiation of low cross-polarization from each port," in TENCON 2006-2006 IEEE Region 10 Conference, Hong Kong, November 2006, pp. 1-3.
[16] H. Gajera, D. Guha, and C. Kumar, "New Technique of Dielectric Perturbation in Dielectric Resonator Antenna to Control the Higher Mode Leading to Reduced Cross-Polar Radiations," IEEE Antennas Wireless Propag. Lett., vol. 16, pp. 445-448, 2017.
[17] Q. Li, S. W. Cheung, and C. Zhou, "A Low-Profile Dual-Polarized Patch Antenna With Stable Radiation Pattern Using Ground-Slot Groups and Metallic Ground Wall," IEEE Trans. Antennas Propag., vol. 65, no. 10, pp. 5061-5068, October 2017.
[18] J. Zhang, K. Yang, E. Eide, S. Yan, and G. A. E. Vandenbosch, "Simple Triple-Mode Dual-Polarized Dipole Antenna With Small Frequency Separation Ratio," IEEE Antennas Wireless Propag. Lett., vol. 19, no. 2, pp. 262-266, February 2020.
[19] Y. Zhang, Z. Song, W. Hong, and R. Mittra, "Wideband high—gain±45° dual—polarised stacked patch antenna array for Ku—band back—haul services," IET Microw. Antennas Propag., vol. 14, no. 1, pp. 53-59, January 2020.
[20] Shi-Gang Zhou, Peng-Khiang Tan, and Tan-Huat Chio, "Low-Profile, Wideband Dual-Polarized Antenna With High Isolation and Low Cross Polarization," IEEE Antennas Wireless Propag. Lett., vol. 11, pp. 1032-1035, 2012.
[21] H. Zhu, Y. Qiu, and G. Wei, "A Broadband Dual-Polarized Antenna With Low Profile Using Nonuniform Metasurface," IEEE Antennas Wireless Propag. Lett., vol. 18, no. 6, pp. 1134-1138, June 2019.

SUMMARY OF INVENTION

Accordingly, the present invention, in one aspect, is a substrate-integrated dielectric resonator, which contains a first substrate layer with a first dielectric constant, a plurality of first vias, and a plurality of second vias. Each first via includes a first via-hole extending through the first substrate layer, and a first dielectric material with a second dielectric constant contained within the first via-hole. Each second via has a second via-hole extending through the first substrate layer and filled with a second dielectric material that has a third dielectric constant.

In some embodiments, the plurality of first vias and the plurality of second vias as a whole are distributed substantially across an entire area of the first substrate layer.

In some embodiments, the plurality of the first vias and the plurality of the second vias are distributed equidistantly from each other, and all the first vias and the second vias have the same diameter.

In some embodiments, the plurality of the first vias and the plurality of the second vias are arranged in a square lattice, a rectangular lattice, a triangular lattice or in a random manner.

In some embodiments, the plurality of second vias includes at least one of the followings: a group of said second vias for controlling an input impedance of the substrate-integrated dielectric resonator; a group of said second vias for enhancing an input bandwidth of the substrate-integrated dielectric resonator; and a group of said second vias for moving an undesired resonator mode out of a passband of the substrate-integrated dielectric resonator.

In some embodiments, the second dielectric constant is larger than the first dielectric constant.

In some embodiments, the third dielectric constant is smaller than the first dielectric constant.

In some embodiments, the third dielectric constant is in the range of 1 to 3.

In some embodiments, the second dielectric constant is equal to or smaller than 20.

In some embodiments, the first dielectric constant is equal to or smaller than 10.2.

In some embodiments, the plurality of second vias includes two parallel rows of said second vias. Each of the two parallel rows have two or more said second vias.

According to another aspect of the invention, there is provided a dielectric resonator antenna that includes a substrate-integrated dielectric resonator, and a second substrate layer arranged on one side of a first substrate layer of the substrate-integrated dielectric resonator. The substrate-integrated dielectric resonator contains a first substrate layer with a first dielectric constant, a plurality of first vias, and a plurality of second vias. Each first via includes a first via-hole extending through the first substrate layer, and a first dielectric material with a second dielectric constant contained within the first via-hole. Each second via has a second via-hole extending through the first substrate layer and filled with a second dielectric material that has a third dielectric constant. The second substrate layer includes a first microstrip feedline and an antenna ground plane.

In some embodiments, the dielectric resonator antenna includes a third substrate layer interposed between the second substrate layer and the first substrate layer.

In some embodiments, at least one of the third substrate layer and the second substrate layer has a fourth dielectric constant which is smaller than a first dielectric constant of the first substrate layer of the substrate-integrated dielectric resonator.

In some embodiments, the third substrate layer further contains a coupling slot that has a longitudinal direction intersecting with that of the first microstrip feedline.

In some embodiments, the third substrate layer contains a second microstrip feedline. The first microstrip feedline and the second microstrip feedline are configured as two feeding ports of the dielectric resonator antenna.

In some embodiments, the second microstrip feedline is configured with a plurality of first feeding vias therethrough.

In some embodiments, the third substrate layer further contains a plurality of second feeding vias which are mirrored from the plurality of first feeding vias about a center of the third substrate layer. The plurality of second feeding vias is located outside of the second microstrip feedline.

According to a further aspect of the invention, there is provided a method of fabricating a substrate-integrated dielectric resonator. The method contains the steps of providing a first substrate layer with a first dielectric constant, forming a plurality of first vias on the first substrate layer, and controlling a resonator mode of the substrate-integrated dielectric resonator by forming a plurality of second vias in the substrate-integrated dielectric resonator. Each said first vias has a via-hole extending through the first substrate layer, and a first dielectric material with a second dielectric constant contained within the first via-hole. Each said second via has a second via-hole extending through the first substrate layer and filled with a second dielectric material that has a third dielectric constant.

In some embodiments, the substrate-integrated dielectric resonator is part of a dielectric resonator antenna.

One can see that embodiments of the invention provide a compact antenna without the need for using external, high dielectric-constant materials that are unavailable for standard PCB manufacturing. The whole antenna structure can be manufactured using standard PCB materials and manufacturing technologies. Due to their low profile and compact size, compact antennas according to embodiments of the invention can be easily integrated into portable devices. Therefore, the antennas are suitable for quick and easy batch manufacturing. In particular, the antennas are suitable for applications, where wide bandwidths and low profile are required.

Also, for antennas provided by embodiments of the invention, by skillfully arranging second vias (e.g. air vias) inside the DRA, the resonant frequencies of different modes can be controlled, and a wide impedance bandwidth with stable radiation performance can be achieved. In one exemplary embodiment, the antenna has a bandwidth of 47.5% and it can easily fully cover the bandwidth of most commercial applications including the 5 GHz Wi-Fi band.

In exemplary embodiments, the antenna could be configured with single polarization or dual polarizations. For dual-polarized antennas in some embodiments of the invention, no additional circuitry, such as baluns, phase shifters, power dividers, are needed. Rather, by configuring two orthogonal antenna feeds in two substrate layers in such antennas, no additional circuitry is required for dual port operation, and good isolation can be achieved between the different antenna ports.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Figure 1A:
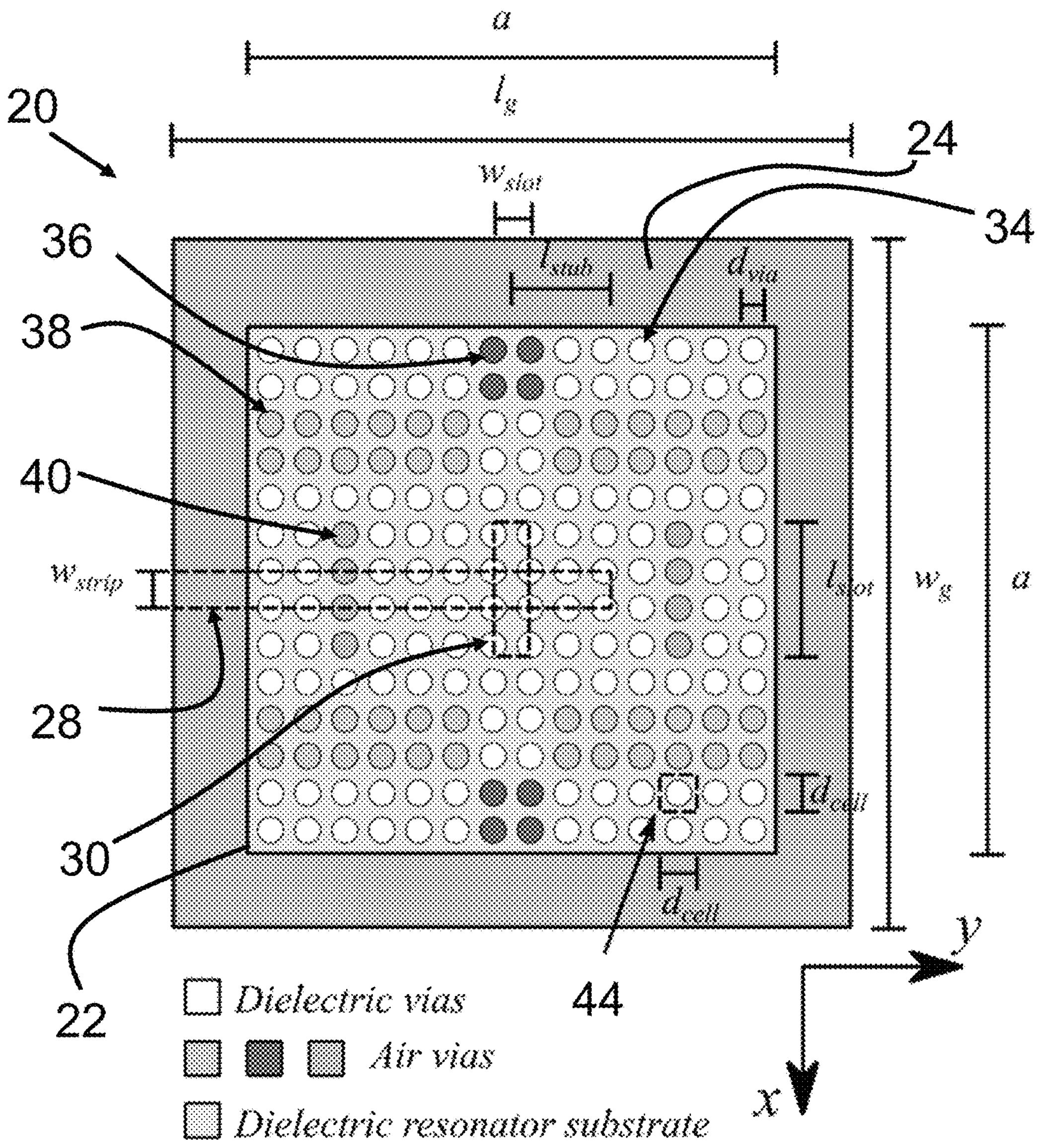
FIG. 1*a* is a top view of a low-profile single-polarized wideband antenna according to a first embodiment of the invention.
Figure 1B:
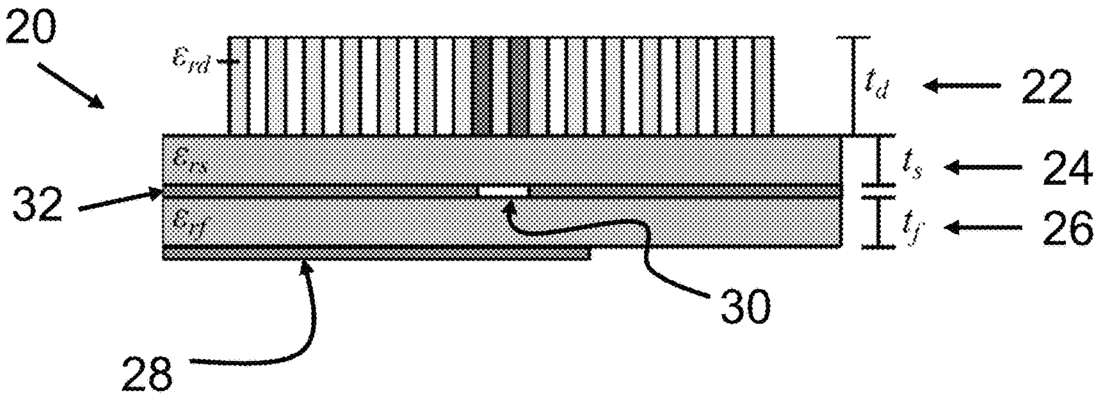
FIG. 1*b* is a side view of the structure of the antenna in FIG. 1*a*.

Referring now to FIGS. 1*a*-1*b*, in which the structure of a compact low-profile wideband dielectric resonator antenna according to a first embodiment of the invention is shown. The antenna 20 contains three PCB substrate layers, namely (from top to bottom) a first substrate layer 22, a second substrate layer 24, and a third substrate layer 26. The second substrate layer 24 is interposed between the third substrate layer 26 and the first substrate layer 22. The first substrate layer 22, together with various via-holes (which will be described in more details layer) therein, form a substrate-integrated dielectric resonator, where "substrate-integrated" means that the resonator is formed in a dielectric substrate. The third substrate layer 26 accommodates a first microstrip feedline 28, an antenna ground plane 32, and a coupling slot 30. The third substrate layer 26 has a thickness of $t_f$ and a dielectric constant of $\varepsilon_{rf}$. The first microstrip feedline 28 is arranged on the bottom side of the third substrate layer 26 and is a metallic planar feedline. The first microstrip feedline 28 has a width $w_{strip}$. As can be seen in FIGS. 1*a*-1*b*, the first microstrip feedline 28 has an elongated shape and extends from an edge of the third substrate layer 26 toward a center (not shown) of the third substrate layer 26 in the horizontal plane (i.e., a virtual plane not shown and parallel to each of the three PCB substrate layers).

The coupling slot 30 is formed in another metal planar layer 32 of the third substrate layer 26, which adjoins the second substrate layer 24. The layer 32 functions as the antenna ground plane of the antenna 20. The coupling slot 30 has a length $l_{slot}$ and a width $w_{slot}$. The coupling slot 30 passes through the center of the third substrate layer 26 in the horizontal plane mentioned above. As best seen in FIG. 1*a*, the coupling slot 30 has a projection in the horizontal plane that intersects with the first microstrip feedline 28, and in particular the longitudinal direction of the coupling slot 30 forms a right angle with that of the first microstrip feedline 28. As shown in FIG. 1*a*, the first microstrip feedline 28 has a length more than one half of the length of the third substrate layer 26, and the first microstrip feedline 28 extends beyond a center (not shown) of the coupling slot 30 by a length stub. As such, the total length of the first microstrip feedline 28 is $l_g/2+l_{stub}$.

The second substrate layer 24 is used as a supporting substrate for the first substrate layer 22. The second substrate layer 24 has a thickness $t_s$ and dielectric constant $\varepsilon_{rs}$. The dielectric constants $\varepsilon_{rs}$ and $\varepsilon_{rf}$ can be the same or different. The first substrate layer 22 is the DRA substrate in the antenna 20, and it has a thickness of $t_d$ and a dielectric constant of $\varepsilon_{rd}$. In one example, $\varepsilon_{rd}$=10.2. The first substrate layer 22 has a side length a, while the second substrate layer 24 has a length $l_g$ and a width $w_g$.

As mentioned above, the first substrate layer 22 have via-holes that extend through the first substrate layer 22. In particular, as can be seen from FIGS. 1*a*-1*b*, the first substrate layer 22 is perforated by cylindrical holes 44 in a periodic manner. With reference to FIG. 1*a*, the cylindrical holes 44 are repeated with a periodicity of $d_{cell}$. Each cylindrical hole 44 has a diameter of $d_{via}$. The cylindrical holes 44 therefore are distributed equidistantly from each other, and each of the cylindrical holes 44 has the same diameter. All the cylindrical holes 44 as a whole is distributed substantially across an entire area of the first substrate layer 22.

The cylindrical holes 44 are either filled with barium strontium titanate (BST) nanoparticles in which case dielectric vias 34 are resulted therefrom, or filled with air in which air vias are resulted. The first substrate layer 22 therefore contains a plurality of first vias (i.e. the dielectric vias) and a plurality of second vias (i.e. the air vias). As best shown in FIG. 1*a* the air vias are divided into three different functional groups which include a first group 36, a second group 38, and a third group 40 The three groups 36, 38, 40 of air vias are shown with different grayscales in FIG. 1*a*, and their different functions will be explained shortly. For each of the groups 36, 38, 40, one can see from FIG. 1*a* that there are at least two parallel rows of air vias, each of the two parallel rows having two or more said air vias.

Figure 2:
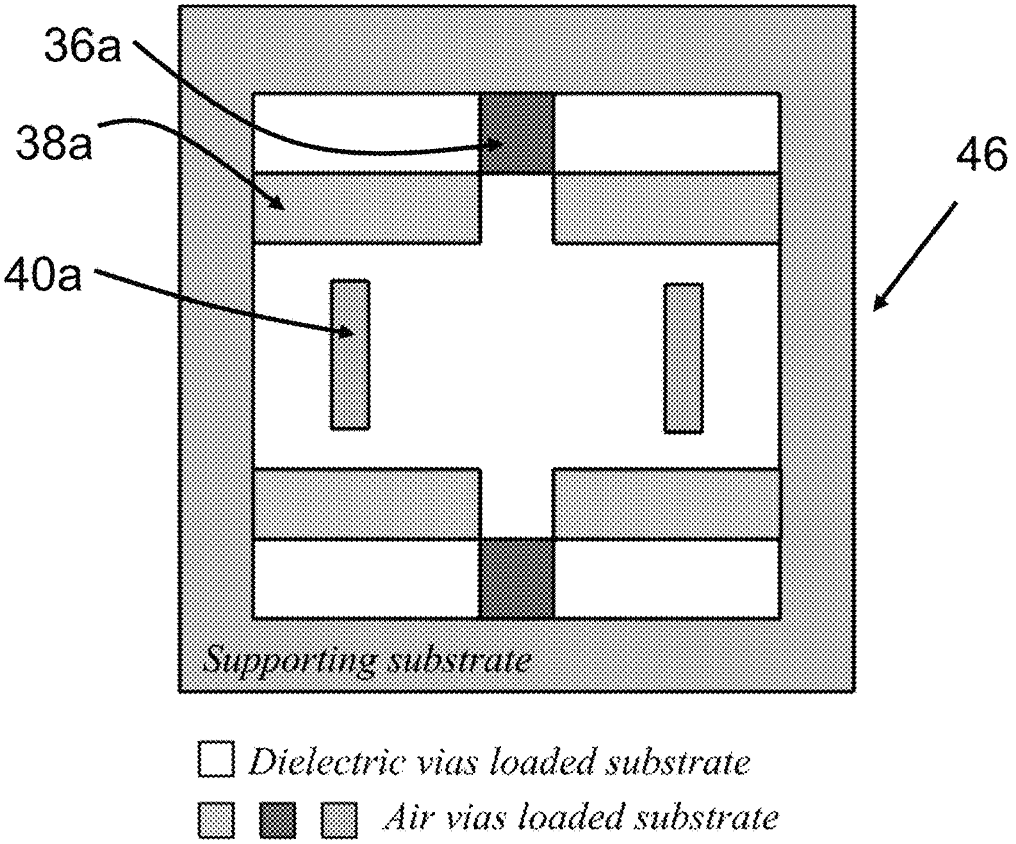
FIG. 2 shows an equivalent layer model of the DRA substrate of the antenna in FIGS. 1*a*-1*b*.
Figure 3:
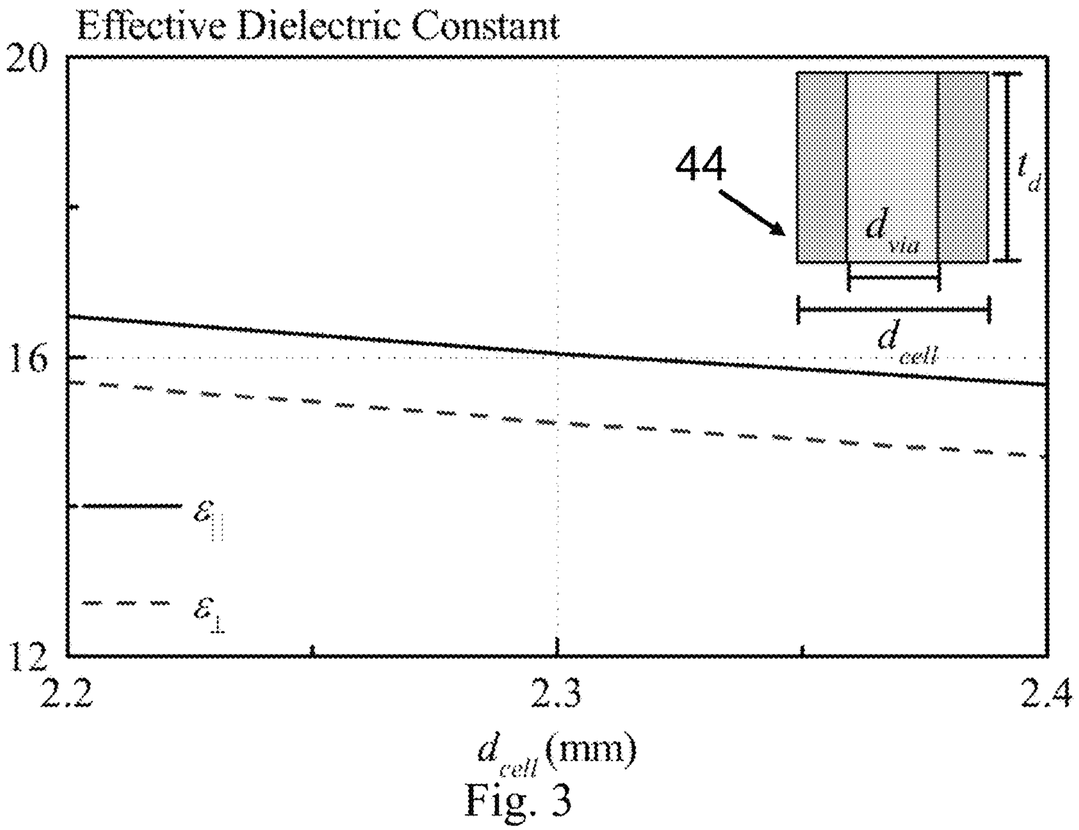
FIG. 3 illustrates the calculation of an effective dielectric constant for the dielectric via unit cell in the DRA substrate of the antenna in FIGS. 1*a*-1*b*.

Next, an effective-media approach aiming at simplifying the design of the antenna 20 in FIGS. 1*a*-1*b* will be introduced. One should understand that the approach described herein is not mandated for designing the antenna 20, but only represents one possible method. The antenna 20 and in particular values of different parameters discussed above can be designed using any other suitable methods in spirit of the invention. As shown in FIG. 2, the dielectric-via-loaded and air-via-loaded first substrate layer 22 is replaced by a homogeneous dielectric slab 46 with an effective anisotropic dielectric constant. In the layer model shown in FIG. 2, first air via sections 36*a* replace (and thus being equivalent to) the first group 36 of air vias in FIG. 1*a*. Second air via section 38*a* replace (and thus being equivalent to) the second group 38 of air vias in FIG. 1*a*. Third air via sections 40*a* replace (and thus being equivalent to) the third group 40 of air vias in FIG. 1*a*. The calculation of the effective anisotropic dielectric constant is done following the scheme, as given in [13]. The cylindrical dielectric-via unit cell indicated by the arrow 34 in FIG. 1*a* is used for the calculation of the effective dielectric constant of the substrate. As mentioned above, each unit cell has a via diameter of $d_{via}$ and a unit cell size of $d_{cell}$. In the example provided hereinafter, for the first substrate layer 22, a via diameter of $d_{via}$=2 mm and a thickness of $t_d$ are used. FIG. 3 shows the calculated effective dielectric constant, along with an inset that shows a side view of the dielectric via 34. The calculation yields two dielectric constants, namely, $\varepsilon_{\parallel}$ and $\varepsilon_{\perp}$, which are different in general. For the case of $\varepsilon_{\parallel}$, the E-field is polarized along the axis of the dielectric via 34, whereas, for the case of $\varepsilon_{\perp}$, the polarization is perpendicular to the axis of the dielectric via 34.

With reference to FIG. 3, the effective dielectric constant decreases with increasing unit cell size for both cases, $\varepsilon_{\parallel}$ and $\varepsilon_{\perp}$. It is reasonable because increasing the unit-cell volume will increase the volume ratio of the substrate material, weakening the dielectric-loading effect of the dielectric vias and, finally, lowering the effective dielectric constant.

Following the same procedure, the calculation can be repeated for the case of air vias but is not shown here for brevity. To accelerate computer simulation, the results obtained by this calculation are used to obtain an equivalent material in place of the real physical via structures inside the first substrate layer 22. For each equivalent material, both parallel and perpendicular components of the effective dielectric constant must be used to correctly represent the dielectric-via and air-via structures. The equivalent layer representation of the design is illustrated in FIG. 2. Each dielectric or air via structure is replaced by a homogeneous material with an effective dielectric constant. This will simplify the design of the structure, as the antenna can be modified much more easily using the equivalent material approach. Furthermore, the design time can be drastically reduced.

The following results will employ the equivalent media approach if not stated otherwise. For the final results, the real physical structure is always simulated and compared with the measured results. For simulation mentioned in the descriptions hereafter, the Ansys HFSS full-wave simulation tool was used to generate all the simulated results.

Figure 4:
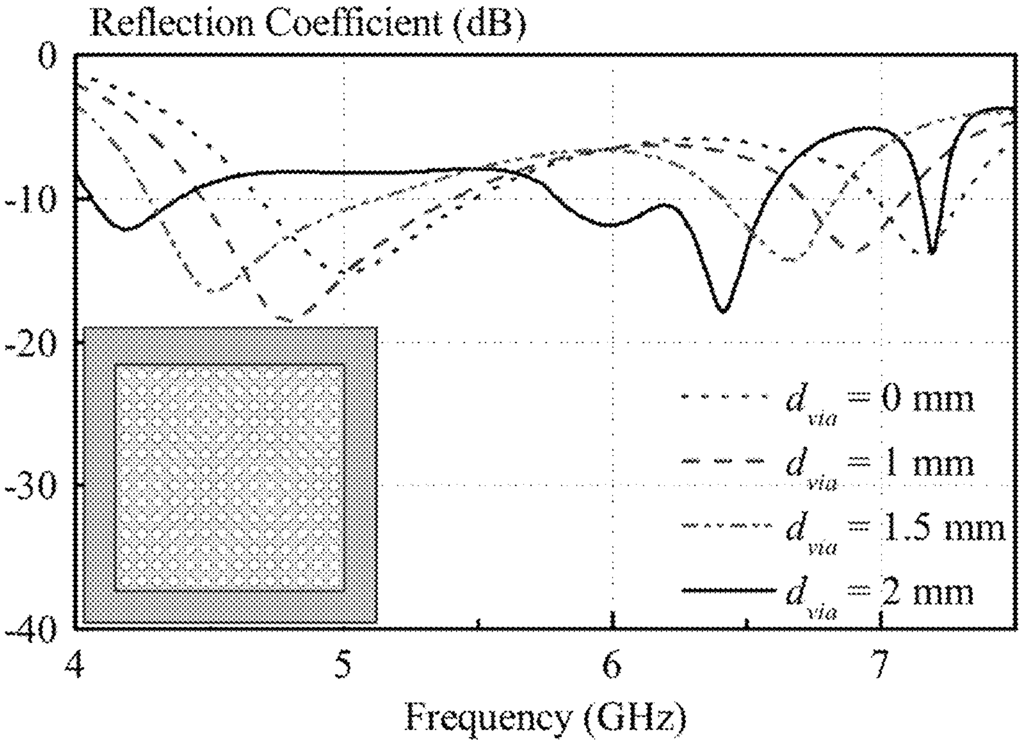
FIG. 4 illustrates the effect of increasing the dielectric vias diameter for a fully dielectric-via loaded antenna, with all the air vias in the antenna in FIGS. 1*a*-1*b* replaced with dielectric vias.

The working principle of the antenna 20 in FIGS. 1*a*-1*b* will now be described. As stated before, the three groups 36, 38, 40 of air vias have different functions. The second group 38 of air vias in FIG. 1*a* can be used to control the input impedance of the antenna 20 To begin, assume that all of the air vias in the three groups in FIG. 1(*a*) be replaced by dielectric vias. To illustrate the function of the dielectric vias, the dielectric-via diameter of a fully dielectric-via loaded DRA (which has the same form factor and the same number of cylindrical holes 44 as that in FIG. 1*a*) is studied in FIG. 4, with the configuration shown in the inset. With reference to FIG. 4, increasing the dielectric vias diameter can decrease the resonance frequencies of different modes, achieving a miniaturization effect that makes the antenna more compact. From this it can also be understood that the dielectric-vias loaded substrate constitutes an effective DRA with its anisotropic dielectric constants as provided in FIG. 3.

Figure 5:
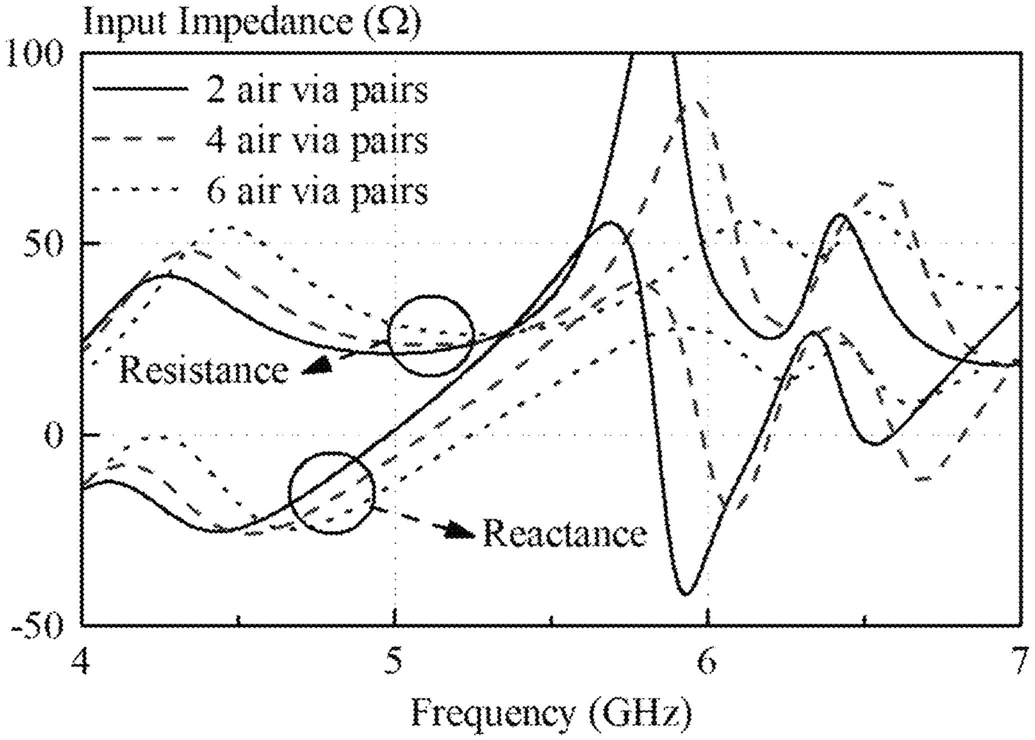
FIG. 5 is a comparison chart of input impedance of an antenna when only the first group of air vias as shown in FIG. 1*a* is employed in the DRA substrate of the antenna in FIGS. 1*a*-1*b*.

Next, the second group 38 of air vias in FIG. 1*a* are successively restored in pairs inward (±y-direction) from the edges of the first substrate layer 22. FIG. 5 shows the change in antenna input impedance for the cases of two, four, and six air-via pairs for each of the four second air via regions 38*a* (see FIG. 2). With reference to FIG. 5, the input impedance of the antenna is gradually improved by increasing the number of air vias, and finally, a stable input impedance is achieved. It can be observed from FIG. 5 that the second group 38 of air vias enable better matching for both the fundamental mode and two higher order modes. It can also be observed that the fundamental mode is slightly shifted to higher frequencies. With reference to FIG. 5, the input impedance of the first higher order mode is gradually reduced to close to 50Ω. An overall stable input impedance can be observed when each second air via regions 38*a* has all the six air-via pairs. As shown in FIG. 5, the resonance frequencies of different modes are shifted to lower frequencies with an increase in the dielectric-via diameter, giving a miniaturization effect.

The effect of the second group 38 of air vias can be understood by considering the quality factor of the DRA [14]. A successive increase in the number of air-via pairs will locally decrease the effective dielectric constant of the DRA. Also, radiation can escape more easily from these parts of the structure, increasing radiation loss and, therefore, reducing the overall quality factor. Furthermore, the air vias have a positive effect on the antenna matching, as seen from FIG. 5. After adding the air vias, the overall fluctuation of the input impedance will be drastically reduced, widening the impedance bandwidth.

Figure 6A:
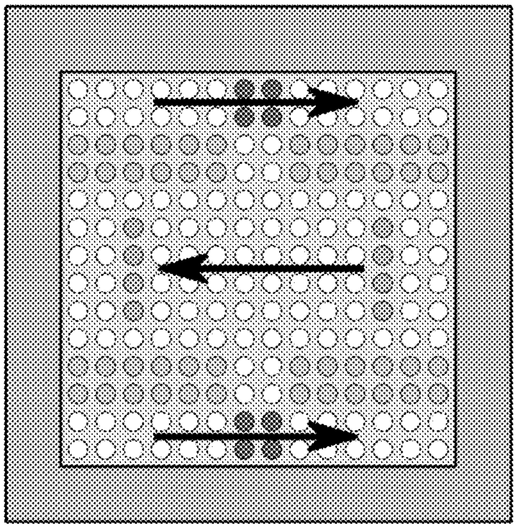
FIGS. 6*a* and 6*b* show respectively the $TE_{311}$-mode field distribution and the $TE_{131}$-mode field distribution of the DRA substrate of the antenna in FIGS. 1*a*-1*b*.

It should be mentioned that the position of the second group 38 of air vias is not arbitrarily chosen. The three arrows in FIG. 6*a* show the strongest E-field of the $TE_{311}$ mode. To minimize the influence of the second air via region 38*a* on the $TE_{311}$ mode frequency, the second air via regions 38*a* are located at the position where the E-field of the mode is relatively weak. It is worth noting that the E-field of the fundamental $TE_{111}$ mode is also relatively weak at the second air via regions 38*a*. As a result, the resonance frequencies of the two modes are not affected significantly, but the impedance matching can be adjusted.

Next, the third group 40 of air vias is analyzed. As shown in FIG. 5, more than one higher order mode can be excited. It was found that one of those resonant modes corresponds to the previously mentioned $TE_{311}$ mode, whereas the other resonant mode corresponds to the $TE_{131}$ mode of the DRA. Although the $TE_{131}$ mode is able to enhance the bandwidth of the antenna, its E-plane radiation pattern was observed to have two radiation nulls. This is undesirable because a wideband antenna should provide stable radiation performance across its passband. The third group 40 of air vias are used here to get rid of this mode.

Figure 6B:
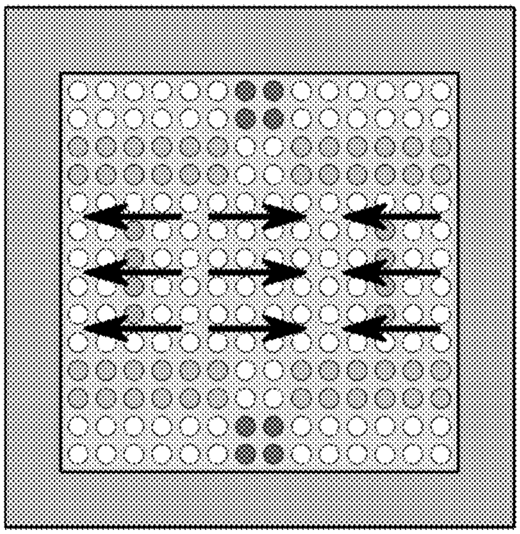

The working principle of the third group 40 of air vias is illustrated in FIG. 6*b*. With reference to FIG. 6*b*, a strong horizontal E-field of the $TE_{131}$ mode is found at the position of the third group 40 of air vias. Therefore, these air vias are able to shift this unwanted mode upward to a higher frequency outside the antenna passband. It should be mentioned that the E-fields of the $TE_{111}$ and $TE_{311}$ modes are strong at the center of the antenna 20 but not at the positions of the third group 40 of air vias Therefore, the resonance behaviors of the two modes are only affected in a minor way.

Figure 7:
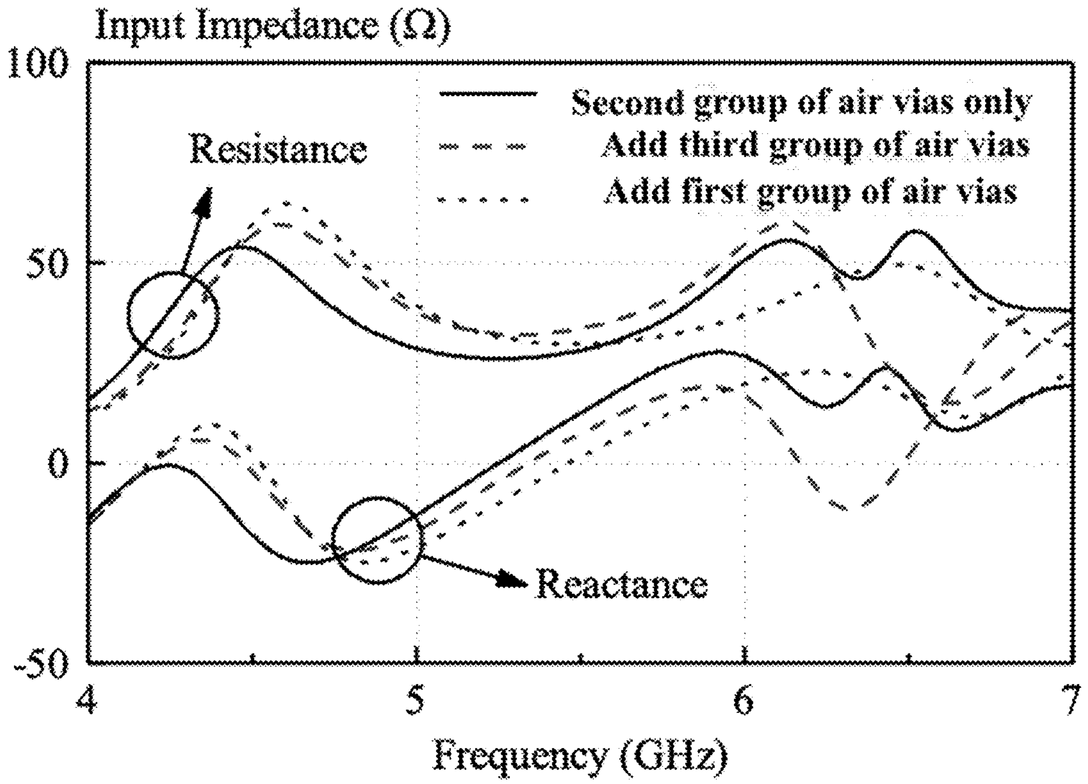
FIG. 7 is a comparison chart of input impedance of DRA after subsequently adding the different groups of air vias in the DRA substrate of the antenna in FIGS. 1*a*-1*b*.

The input impedance after introducing the third group 40 of air vias is shown in FIG. 7. In FIG. 7, the case of "second group of air vias only" corresponds to the DRA loaded with the second group 38 of air vias only, same as the case of "six air via pairs" in FIG. 5. The result after adding the third group 40 of air vias is labeled as "add third group of air vias". Notably, compared to the case of "second group of air vias only", only two instead of three resonant modes can be found in the input impedance graph, thereby showing that the $TE_{131}$ mode has been shifted to a higher frequency, no longer interfering with the antenna passband.

Finally, the first group 36 of air vias can be used to further enhance the antenna impedance bandwidth. The first group 36 of air vias are placed near the upper and lower edges, where the horizontal E-field of the $TE_{311}$ mode has local maxima, as illustrated in FIG. 6*a*. Therefore, the $TE_{311}$ mode is shifted to a higher frequency, thus increasing the separation between this mode and the fundamental mode. As a result, the bandwidth is widened. The input impedance of this case is given in FIG. 7 as "add first group of air vias." With reference to FIG. 7, a stable, slowly varying input impedance can be observed in this case, giving a wide impedance bandwidth of the antenna.

The design procedure in the above exemplary design approach be concluded as follows. By skillfully placing air vias inside the dielectric via loaded DRA, the resonant modes can be manipulated, thereby improving the antenna impedance bandwidth and matching. The air-via positions have to be chosen carefully in order to achieve the effects of input impedance control, manipulation of the DRA quality factor, and shifting or removal of dielectric-resonator modes that have undesirable radiation patterns.

Figure 8A:
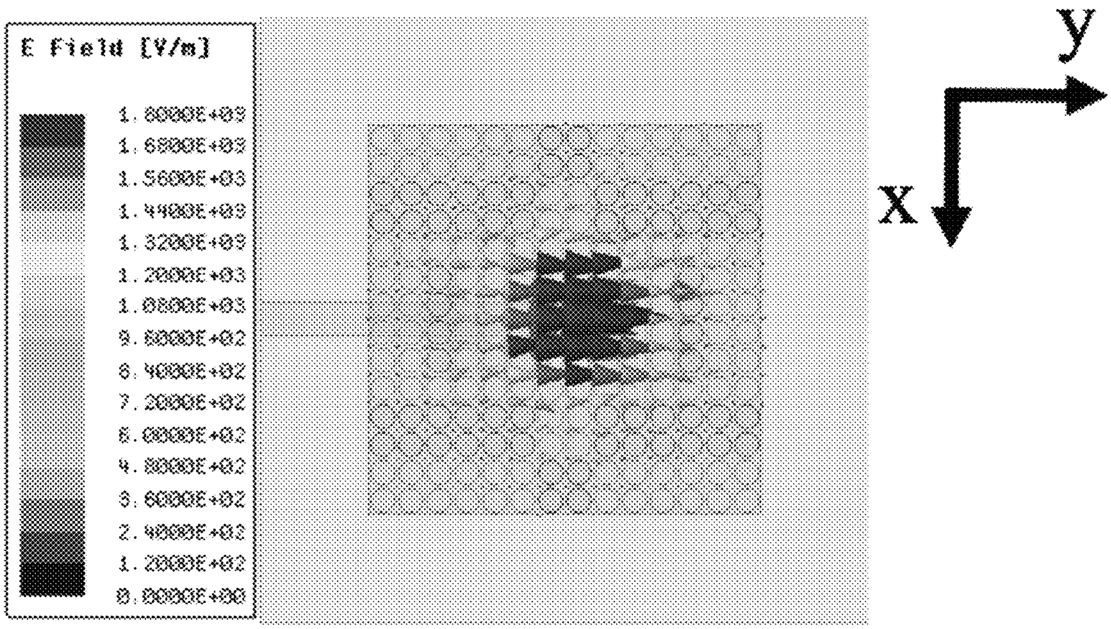
FIGS. 8*a* and 8*b* show respectively the E-field distribution inside the DRA substrate of the antenna in FIGS. 1*a*-1*b* at 4.5 GHz and 6.5 GHz.
Figure 8B:
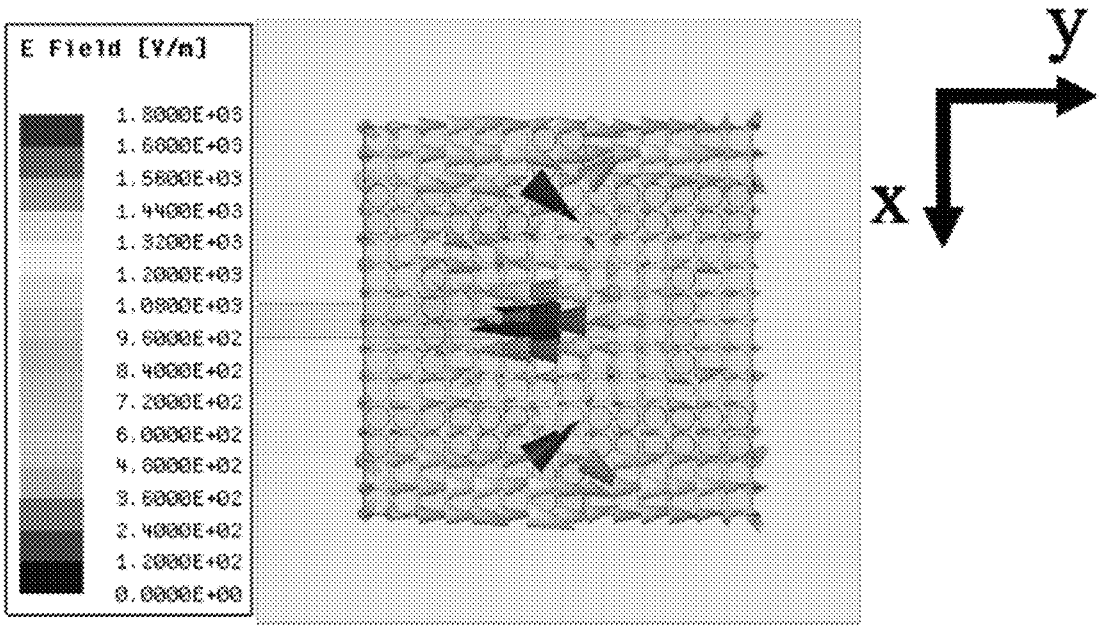

Next, the resonant modes of the structure of the first substrate layer 22 are checked. FIG. 8*a* shows the E-field distribution of the fundamental $TE_{111}$ mode at 4.5 GHz. As can be seen from FIG. 8*a*, the E-field has one variation in both x- and y-directions, thus corresponding to the fundamental $TE_{111}$ mode. At 6.5 GHz, the E-field distribution changes to the one shown in FIG. 8*b*. With reference to FIG. 8*b*, the electric field exhibits three variations in the x-direction and one variation in the y-direction. Thus, this mode corresponds to the $TE_{311}$ mode.

Experimental results were obtained to verify the simulations. An antenna prototype (not shown) was built according to the antenna 20 in FIGS. 1*a*-1*b*. The antenna prototype has the following dimensions: a=32.5 mm, wg=53 mm, lg=57 mm, $l_{slot}$=9.1 mm, $w_{slot}$=3.8 mm, $l_{stub}$=4 mm, $w_{strip}$=2.7 mm, $d_{via}$=2 mm, $d_{cell}$=2.3 mm, is =1 mm, $\varepsilon_{rs}$=2.65, $\varepsilon t_f$=1 mm, $\varepsilon_{rf}$=2.65, $t_d$=4 mm, and $\varepsilon_{rd}$=10.2. The dielectric vias are filled with a BST material with a measured dielectric constant of 20 and a loss tangent of 0.023.

One can see that in the prototype, both the feeding substrate (which corresponds to the third substrate layer 26 in FIG. 1*b*) and the supporting substrate (which corresponds to the second substrate layer 24 in FIG. 1*b*) have a thickness of 1 mm and a dielectric constant of 2.65. This dielectric constant is smaller than the first dielectric constant of the DRA substrate which is 10.2, and smaller than the dielectric constant of the BST material which is 20. It should be mentioned that in the prototype, a protective layer of silicone rubber was applied on top of the DRA substrate (which corresponds to the first substrate layer 22 in FIG. 1*b*) to seal the dielectric vias and shield them from any environmental or mechanical damages. In the experiment, no noticeable effect of this layer on the antenna performance was found. A small section of DRA substrate with screw holes is added to the basic design for precisely mounting the DRA on the PCB. The DRA substrate is split into two separate substrates each of a thickness of 2 mm (i.e., the total DRA thickness is 4 mm), as it is easy to obtain this substrate thickness in practice. As opposed to the working principle of the antenna 20 as mentioned above, the simulation of the actual physical implementation of the vias-loaded DRA is used for comparison with the measured results instead of the equivalent material model.

In one example of the manufacturing method to make the antenna prototype, a powder material is used to constitute the dielectric vias. In this case, a multitude of methods can be used to protect the dielectric vias from its environment and assure that the powder stays in place. For instance, a thin layer of silicone can be used. Other methods include a thin sheet of material attached to the DRA substrate, such as to prevent leakage of environmental effects on the powder. In other instances of the invention the powder is replaced by a solid, a liquid material or a paste material, which can be dried after being inserted into the via holes. Similar to the powder case, the dielectric via material is protected by different means from environment influences, as well as assuring mechanical persistence of the structure.

Figure 9:
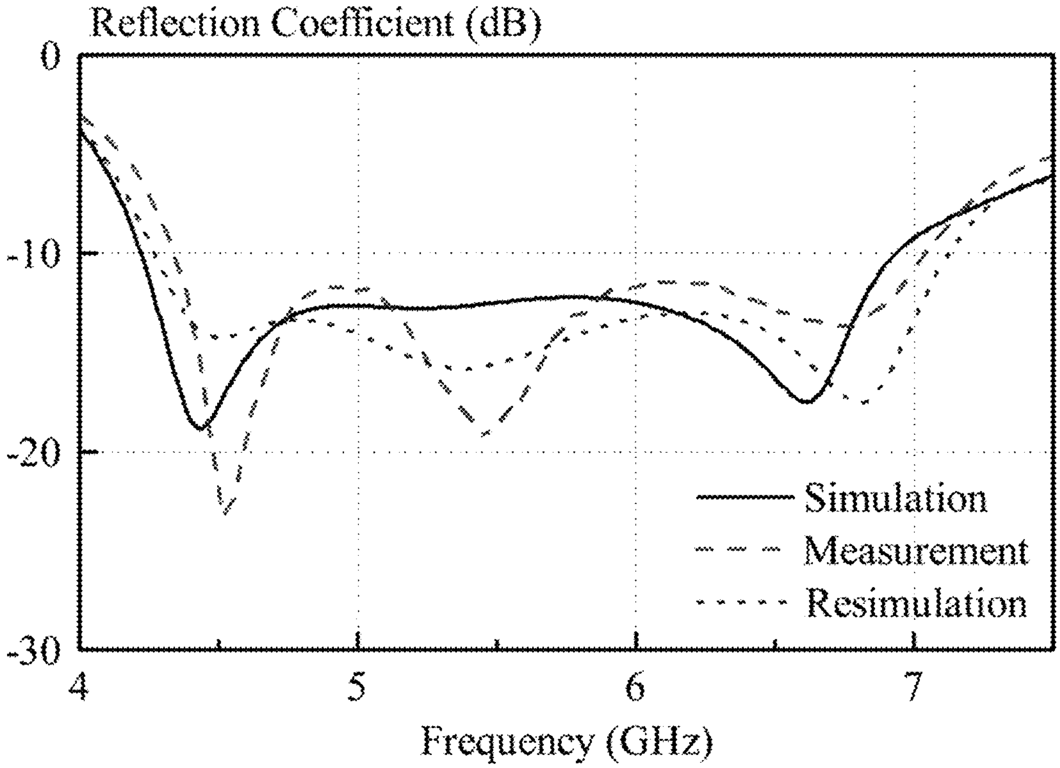
FIG. 9 shows measured (on a prototype) and simulated reflection coefficients of the antenna in FIGS. 1*a*-1*b*.

The measured and simulated reflection coefficients are shown in FIG. 9. With reference to FIG. 9, good agreement is achieved with some slight frequency shift, which might be caused by manufacturing and material tolerances. The measured and simulated impedance bandwidths are 47.5% (4.34-7.04 GHz) and 48.6% (4.22-6.93 GHz), respectively. The design was re-simulated with slightly different parameters, and better agreement with the measurement was found. Besides slightly changed feeding parameters, a small air gap between the two 2 mm-thick DRA substrates may exist in practice, leading to a change in the reflection coefficient. The dielectric via height may also be somewhat lower in practice due to the manual assembly error.

Figure 10:
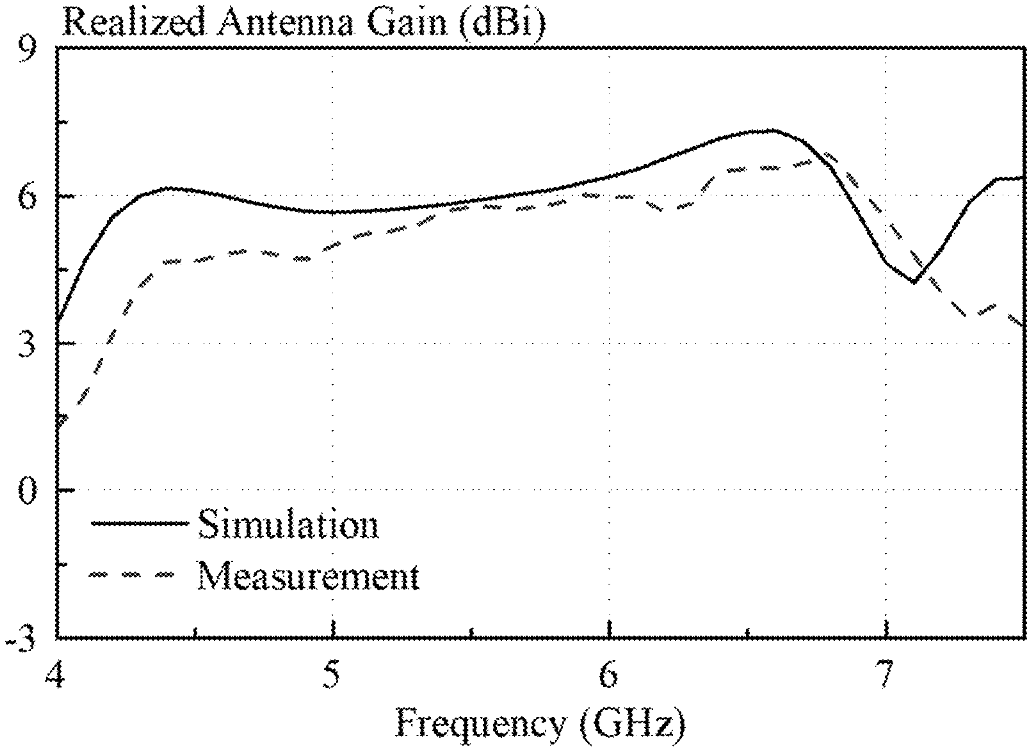
FIG. 10 shows measured (on a prototype) and simulated realized antenna gains of the antenna in FIGS. 1*a*-1*b*.
Figure 11:
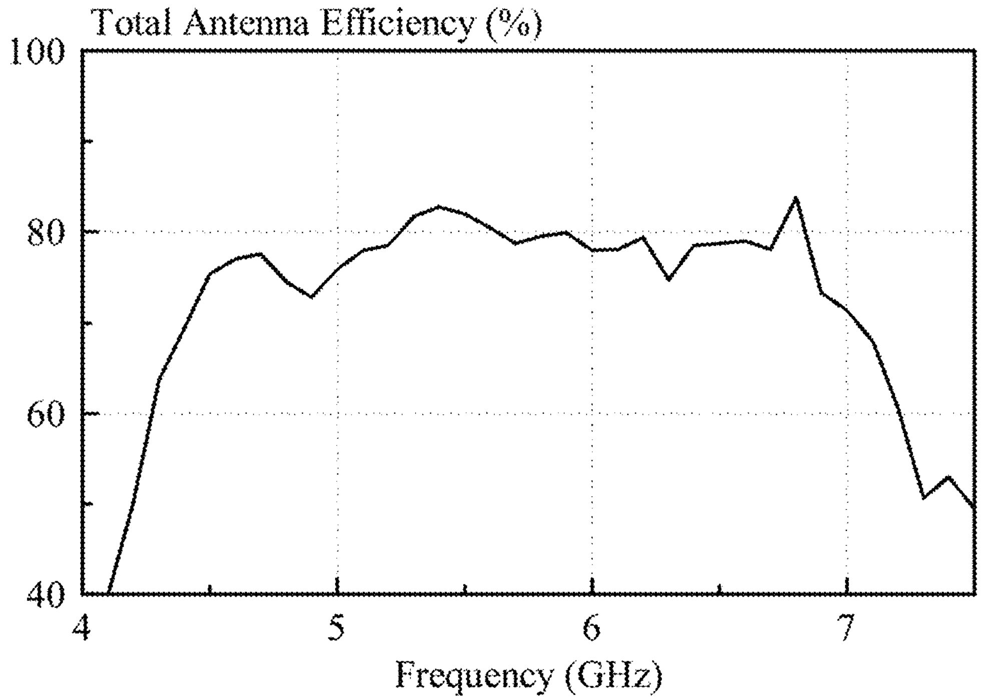
FIG. 11 shows measured total antenna efficiency of the prototype in FIG. 9.
Figure 12A:
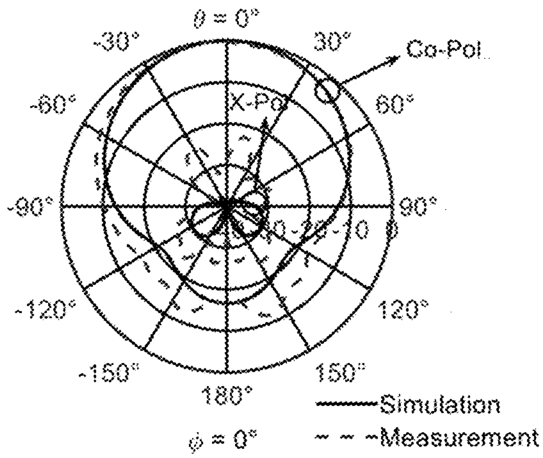
FIGS. 12*a* and 12*b* show measured (on a prototype) and simulated radiation patterns of the antenna in FIGS. 1*a*-1*b* at 4.5 GHz, when Φ=0° and Φ=900 respectively.
Figure 12B:
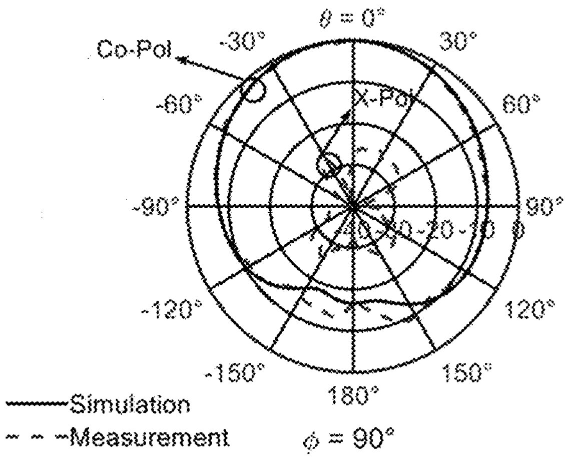
Figure 13A:
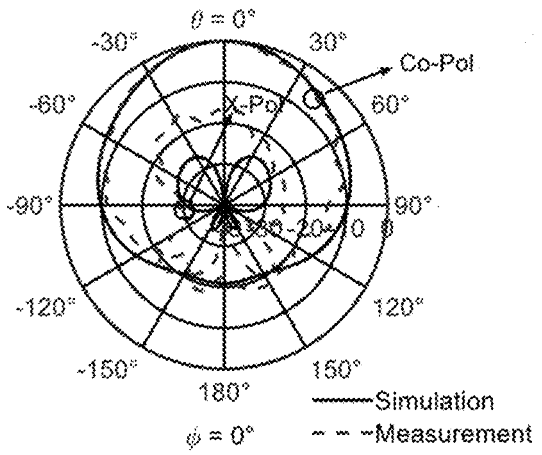
FIGS. 13*a* and 13*b* show measured (on a prototype) and simulated radiation patterns of the antenna in FIGS. 1*a*-1*b* at 6.5 GHz, when Φ=0° and Φ=90° respectively.
Figure 13B:
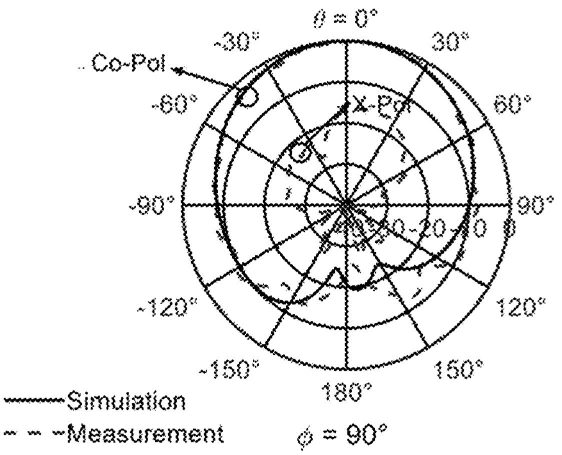

The measured and simulated realized antenna gains are compared in FIG. 10. A reasonable agreement between simulation and measurement can be observed. As can be observed from FIG. 10, the measured and simulated peak broadside gains are 6.84 and 7.32 dBi, respectively. Discrepancies might be caused by connector and cable losses along with the manufacturing and material tolerances. The measured total antenna efficiency with mismatch included is shown in FIG. 11. A peak efficiency of 83.7% with an average efficiency of 77% is obtained.

This also shows that, even though the loss tangent of the BST material constituting the dielectric vias may appear quite high at first glance, reasonable antenna efficiencies can still be obtained because of the averaging effect of the substrate and BST materials. Since the BST vias occupy roughly 60% of the dielectric-via unit cell volume, the effective loss tangent of the dielectric-via loaded material is approximately an average of the loss tangents of the two materials.

The measured and simulated radiation patterns at 4.5 and 6.5 GHz are shown in FIGS. 12*a*-12*b*, and FIGS. 13*a*-13*b* respectively. Both the E-plane and H-plane results are given. With reference to FIGS. 12*a*-13*b*, good agreement between the measurement and simulation is obtained at both frequencies. Stable radiation patterns across the entire antenna passband can be observed. The antenna prototype exhibits low backlobe radiation of less than −15 dB. It also exhibits a low cross-polarization level of less than −15 dB across the antenna passband.

TABLE I

COMPARISON BETWEEN ANTENNA 20 AND OTHER ANTENNAS

| Ref. | Impedance BW (sim./exp.) (%) | Peak Gain (sim./exp.) dBi | Resonator $\varepsilon_r$ | Antenna size ($\lambda_0^3$) | Resonator type | Feed network complexity | PCB-compatible |
|---|---|---|---|---|---|---|---|
| [4] | 40.4/42.4 | 10.5/10.5 | 15 | 0.77 × 0.77 × 0.093 | DRA | Simple | No |
| [5] | —/39 | —/9.6 | 45 | 0.514 × 0.514 × 0.1 | DRA | Simple | No |
| [7] | 18.8/20.3 | 7.92/7.7 | 45 | 0.41 × 0.41 × 0.06 | DDP | Simple | No |
| [8] | 34.6/23.5 | 17.9/17.9 (array) | 10 | — | DDP | Complex | Yes |

TABLE I-continued

COMPARISON BETWEEN ANTENNA 20 AND OTHER ANTENNAS

| Ref. | Impedance BW (sim./exp.) (%) | Peak Gain (sim./exp.) dBi | Resonator $\varepsilon_r$ | Antenna size ($\lambda_0^3$) | Resonator type | Feed network complexity | PCB-compatible |
|---|---|---|---|---|---|---|---|
| [9] | —/81.9 | —/9.27 | 36.5 | 0.673 × 0.224 × 0.133 | DDP | Complex | No |
| Antenna 20 | 48.6/47.5 | 7.32/6.84 | 10.2 | 0.616 × 0.616 × 0.095 | DRA | Simple | Yes |

$\lambda_0$: Wavelength at the center frequency of the passband.

Figure 14:
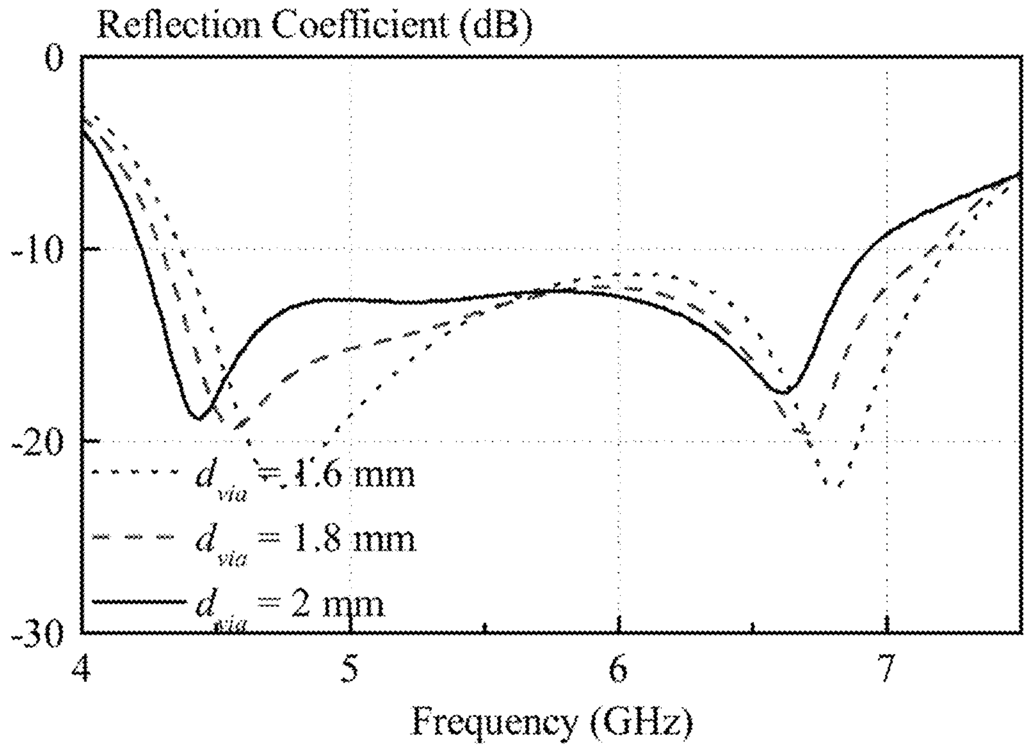
FIG. 14 illustrates a parametric study on the effect of changing the dielectric via diameter of the antenna in FIGS. 1*a*-1*b*.

The effect of changing the dielectric via diameter of the single-port wideband design is also analyzed, and its result is shown in FIG. 14. With reference to FIG. 14, the performance of the proposed design remains stable as the dielectric-vias and air-vias diameters decrease simultaneously. This shows that the antenna 20 in FIGS. 1*a*-1*b* can work for different choices of dielectric via and air vias sizes, giving greater design freedom.

A comparison of the antenna 20 with existing low-profile DRAs and DD patch antennas is given in Table I above. As can be observed from the table, the antenna 20 possesses the widest bandwidth amongst all of the DRA designs. Since the antenna 20 deploys a relatively low dielectric constant material, its size is somewhat larger than those using other approaches, such as DD patch antennas or other DRAs with very high dielectric constant materials, as in [5]. However, the fact that the antenna 20 can be fully manufactured using the PCB technology makes it very attractive for practical applications, as most other designs rely on expensive, high dielectric constant materials, and/or special manufacturing techniques to realize the designs. It should be noted that, due to the limitation of the employed design approaches, some designs in Table I may not be easily extended to dual-polarized designs. For instance, the design in [9] requires multiple slots and a power divider to achieve good impedance matching. Furthermore, the antenna is not symmetric, and its width is much larger than its length, making it difficult to obtain a dual-polarized wideband antenna. The prototype of the antenna 20 achieves a wide measured impedance bandwidth of 47.5% and a maximum measured gain of 6.84 dBi. Furthermore, a small antenna footprint of $0.616\times0.616\lambda^2_0$ with a low profile of $0.095\lambda_0$ is achieved, where $\lambda_0$ is the wavelength in the air at the center frequency.

A basic guideline for the design of the antenna 20 is outlined as follows.

1) As the first step, the unit cell and via size should be chosen. A good choice that allows for easy placement and control of the vias is a unit cell size of $d_{cell}=0.043\lambda_0$, where $\lambda_0$ denotes the wavelength at the center frequency of the passband. Next, the via diameter can be chosen to be approximately 87% of that of the unit-cell side length or $d_{via}=0.0373\lambda_0$. If a smaller via diameter is chosen, the resulting center frequency will shift upward. Using these values, the equivalent layer model can be constructed. For each equivalent layer, an effective dielectric constant should be used. Many different approaches exist; for instance, the one described in [13] can be used.
2) The initial dimensions of the DRA can be chosen such that the side length is $0.61\lambda_0$ with a thickness of $0.095\lambda_0$ and a supporting substrate thickness of $0.02\lambda_0$. A length of $0.61\lambda_0$ will result in approximately 14 unit cells of vias fitting into each lateral dimension of the DRA, or equivalently a 14×14 grid of via holes, if a unit cell size of $0.043\lambda_0$ is chosen.
3) Next, in the equivalent dielectric constant model of FIG. 2, the second group of air via is subsequently added. They should be placed $0.17\lambda_0$ (four unit cell lengths) from the center of the DRA, with a length and width of $0.26\lambda_0$ (six unit cells) and $0.086\lambda_0$ (two unit cells), respectively. If the choice of the dielectric and air vias is smaller or larger, the length and width of these sections should be adjusted to achieve sufficient bandwidth and matching.
4) The third group of air vias is now added at $0.086\lambda_0$ from the DRA edge with a length and width of $0.17\lambda_0$ and $0.043\lambda_0$, respectively. The third group of air vias is used to suppress the excitation of an unwanted mode with undesirable radiation patterns. Thus, after they are added, the bandwidth of the antenna is reduced somewhat. Finally, the side air-via loading (first group of air vias) are added to maximize the bandwidth. They are placed at the edge of the DRA with both its length and width given by $0.086\lambda_0$.
5) In the last step, the equivalent layer model can be converted into the real, via-loaded DRA.

Since the antenna 20 described above is dependent on the choice of the via size, it should be pointed out that, for other via and unit-cell sizes, the required length and width of the different air-via sections may vary a bit. As a general rule, the ratio of dielectric via-diameter to unit-cell size, $d_{via}/d_{cell}$, should be approximately chosen as $d_{via}/d_{cell}=0.87$. For smaller ratios, the design frequency will shift upward, and larger ratios result in frequency shift to lower frequencies.

Figure 15:
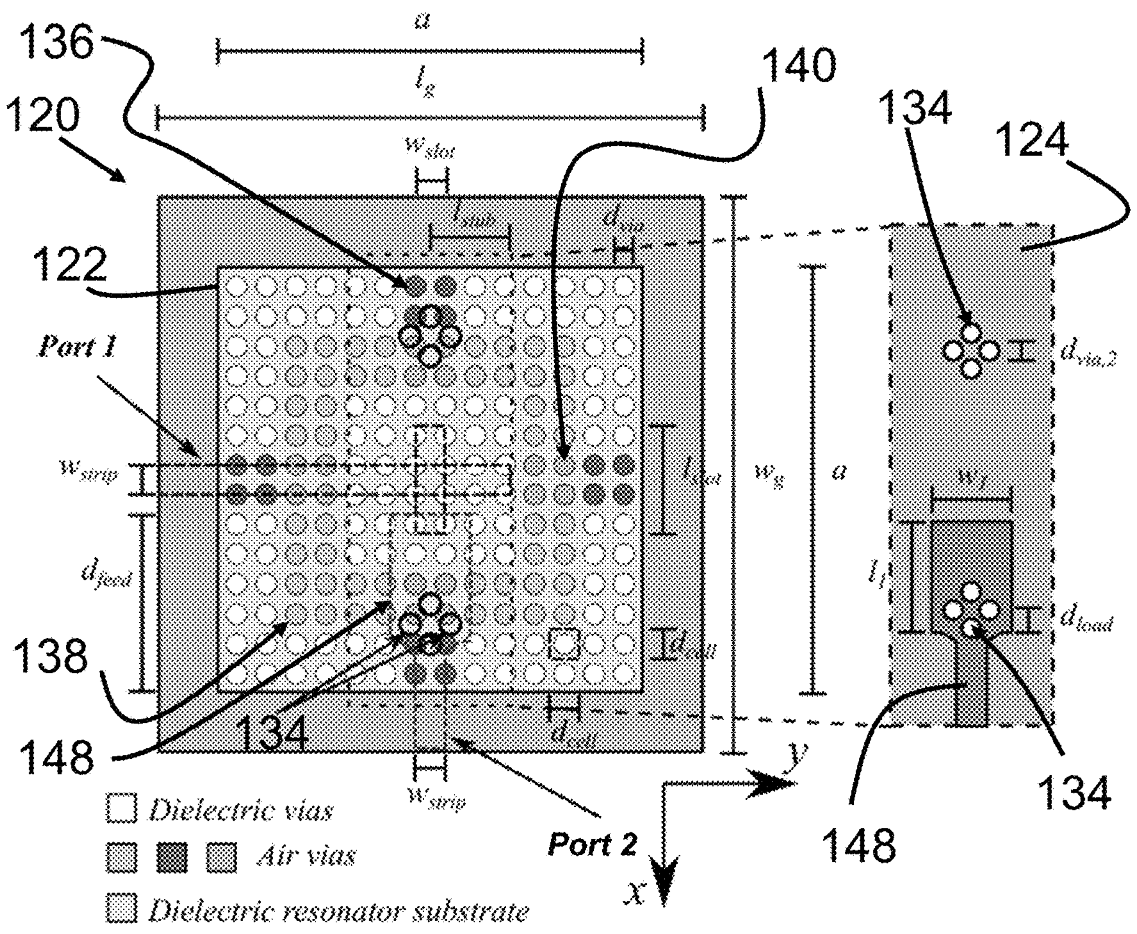
FIG. 15 is a top view of a low-profile dual-polarized wideband antenna according to a second embodiment of the invention, along with a view of an upper microstrip feeding line below the DRA substrate.

Turning to FIG. 15, in another embodiment of the invention, a dual-polarized antenna 120 is shown. The antenna 120 have a similar three-layer structure (not shown) as the antenna in FIGS. 1*a*-1*b*, and the third substrate layer (not shown) of the antenna 120 (including its first microstrip feedline and coupling slot) is similar to that in the antenna in FIGS. 1*a*-1*b*. The structures of each individual via-hole in the first substrate layer 122, the number of via-holes, the lattice of the via-holes, are also similar to that shown in FIG. 1. Lastly, the materials of the three substrate layers in the antenna 120 including their dielectric constants, and the dielectric material in the dielectric vias, are similar to those of the antenna in FIG. 1*a*. For the sake of brevity these similar characteristics are not described in details again herein.

Compared to the antenna in FIGS. 1*a*-1*b*, the antenna 120 differs both in the first substrate layer 122 (which is the DRA layer), and in the second substrate layer 124. In particular, in the second substrate layer 124 there is contained a second microstrip feedline 148. The second microstrip feedline 148 extends from an edge of the second substrate layer 124 toward a center of the second substrate layer 124 in the horizontal plane (not shown). The second microstrip feedline 148 functions as a second port (Port 2) of the antenna 120, while the first microstrip feedline functions as a first port (Port 1) of the antenna 120. The second microstrip feedline 148 has a width $w_{strip}$ and a rectangular section with length $l_1$ and width $w_1$. The second microstrip feedline 148 has a total length of $d_{feed}$ from the edge of the first substrate layer 122. The dimensions of the second microstrip feedline 148 can be tuned to achieve a good impedance match across the passband.

One can see that Port 2 of the antenna 120 (i.e., second microstrip feedline 148) is added along the x-axis. The circuit is printed on the second substrate layer 124, which has a thickness of $t_s$ and a dielectric constant of $\varepsilon_{rs}$. The Port 1 and Port 2 feeding circuits, that are, the first microstrip feedline and the second microstrip feedline 148, form an orthogonal feed system, i.e., the resonant modes of the two ports are orthogonally excited with respect to each other. It has been proven in [15] that this feeding scheme can achieve high port isolation for dual-polarized patch antennas.

Furthermore, four dielectric vias 134 are inserted into the second microstrip feedline 148 to enhance the overlapping bandwidth of the two ports. The dielectric vias 134 (also called "feeding vias" herein) are mirrored about the center of the second substrate layer 124 in order to keep the structure symmetric. As shown in FIG. 15, the four dielectric vias 134 in the second microstrip feedline 148 form a diamond shape, and there are another four dielectric vias 134 located outside of the second microstrip feedline 148 which also form a diamond shape. As shown in FIG. 15, each of the dielectric vias 134 in the second substrate layer 124 has a diameter of $d_{via,\ 2}$, and a distance between the centers of two adjacent dielectric vias 134 is $d_{load}$. The other parameters shown in FIG. 15 have similar definitions as those in FIG. 1*a*.

Figure 16:
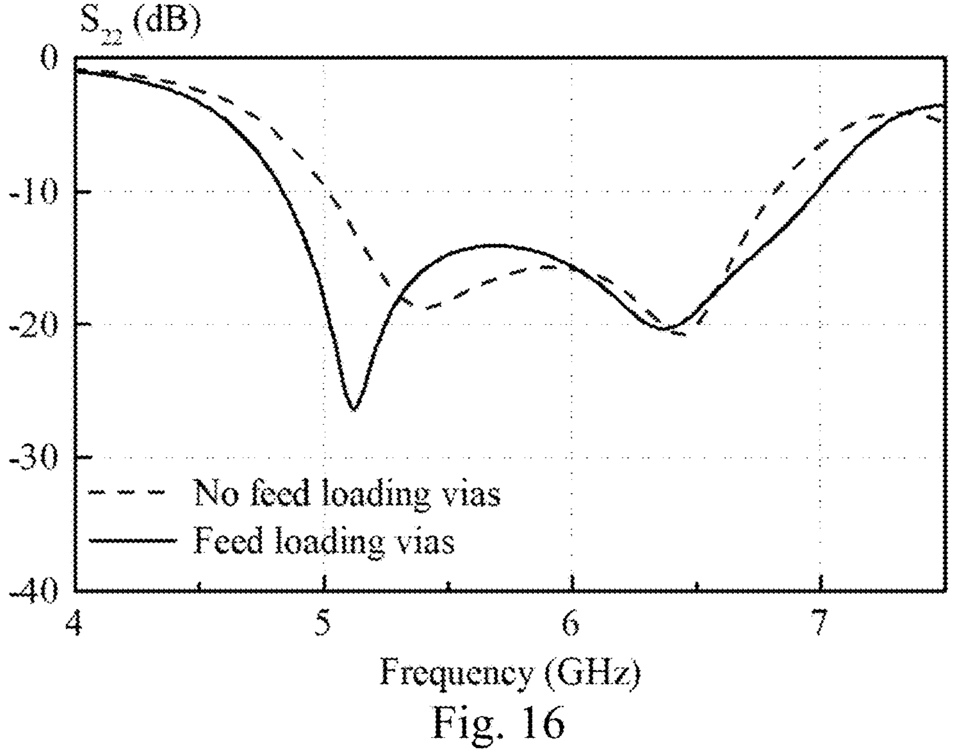
FIG. 16 shows simulated reflection coefficient of port 2 with and without the feeding vias in the antenna of FIG. 15.

It was found that, compared with the Port 1, Port 2 has a slightly higher resonance frequency. This may be due to the boundary condition introduced by the metallic planar feedline, leading to a reduced overlapping bandwidth of the dual-port design. Loading the Port 2 feeding substrate (i.e., the second substrate layer 124) with dielectric vias 134, the resonance frequency of the fundamental mode of Port 2 can be shifted downward, thus widening the overlapping bandwidth of the antenna 120. The effect of these vias is shown in FIG. 16. As can be seen from the figure, the fundamental mode of Port 2 is significantly shifted to a lower frequency, thus widening the bandwidth of Port 2 from 30.4% (5.02-6.82 GHz) to 36.55% (4.83-6.99 GHz).

Similar to the antenna in FIGS. 1*a*-1*b*, the antenna 120 in its first substrate layer 122 (i.e., the DRA structure of antenna 120) contains both dielectric vias 134, and air vias that are divided into three different functional groups 136, 138, 140, as illustrated in FIG. 15. Although, at the first glance, the air vias arrangement inside the DRA structure might appear quite different from the one in FIG. 1*a*, it can be constructed using the design technique described above for the antenna in FIGS. 1*a*-1*b* in the following way. The arrangement of the first group of air vias in FIG. 1*a*, as represented by the first air via sections in FIG. 2, can be rotated by 90° around the z-axis, which gives the arrangement of the first group 136 of air vias in FIG. 15.

Next, the arrangement of the second group of air vias in FIG. 1*a*, as represented by the second air via sections in FIG. 2, can be rotated as well by 90° to obtain the same air-via section for Port 2. As opposed to the antenna in FIGS. 1*a*-1*b*, the rotated sections of the second group 138 of air vias can significantly load the higher order modes of the two ports, therefore shifting their resonance frequencies to higher frequencies. To mitigate this effect in the dual-port design, the long air-via section does not directly begin at the edge, but it is offset from the latter by two unit cells, i.e., these vias are filled with the BST nanoparticles. In this way, the air-via loading of the higher order mode can be reduced for both ports.

Finally, in the simulation of the antenna 120, it was found that the E-fields excited by the planar feed tend to have significant y-directed components. This may be related to the spurious excitation of a hybrid TE/TM mode with $E_x$ and significant $E_y$ components in the H-plane (y-z plane) of Port 2, leading to a considerable cross-polar level. It was found that these y-directed E-fields increase the H-plane cross-polarization of Port 2. This is analogous to the cylindrical DRA case; its $HEM_{21\delta}$ mode is one of the contributors to the H-plane cross polarization of the antenna when using a probe-feed excitation [16]. By loading the DRA with air vias at appropriate positions, this mode can be shifted to a higher frequency, and subsequently, the cross polarization can be reduced.

Figure 17:
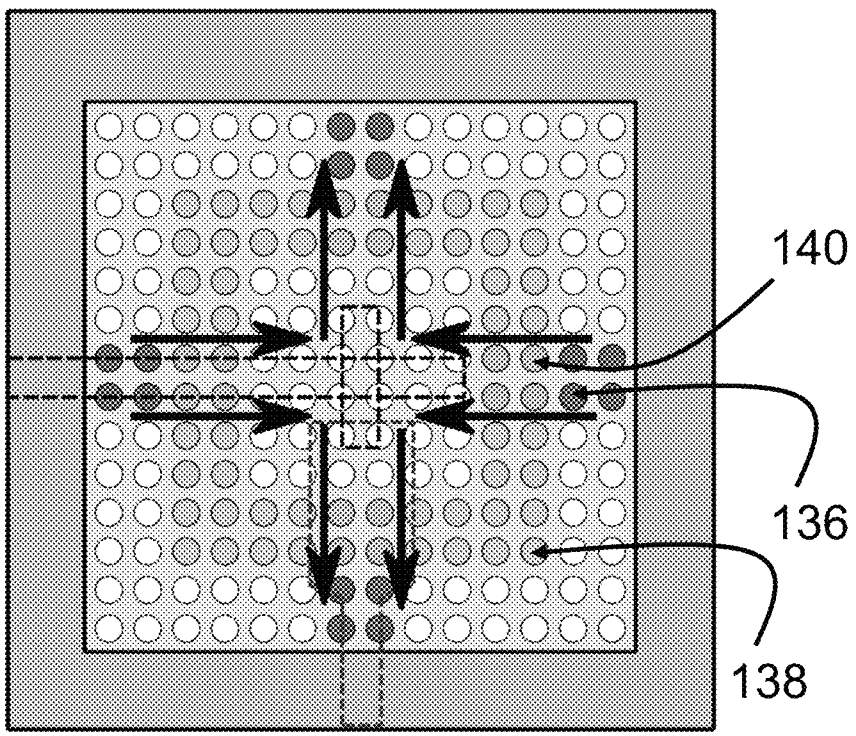
FIG. 17 is an illustration of the working mechanism of the third group of air vias in the antenna of FIG. 15.

The third group 140 of air-vias in FIG. 15 is used to suppress the high cross polarization of Port 2. The mechanism is illustrated in FIG. 17. With reference to the figure, the third group 140 of air vias are placed at locations where the horizontal $E_y$-field of the hybrid TE/TM mode is strong. Therefore, the third group 140 of air vias shift this mode to a higher frequency and weaken its excitation, lowering the H-plane cross polarization of Port 2. In order to keep the structure symmetric, it is rotated again by 90° resulting in the structure, as shown in FIG. 15.

Figure 18A:
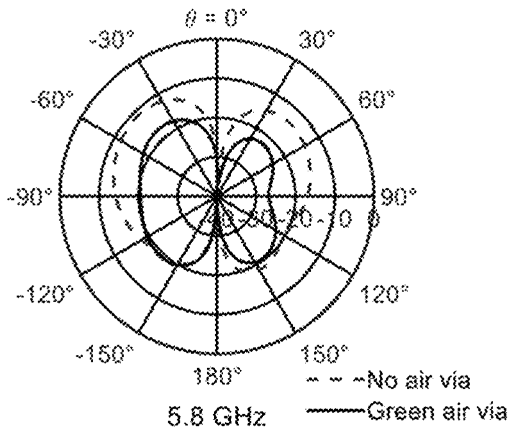
FIGS. 18*a* and 18*b* show the simulated normalized y-z-plane cross-polarization level of port 2 of the antenna of FIG. 15 before and after introducing the third group of air vias, at 5.8 GHz and 6.6 GHz, respectively.
Figure 18B:
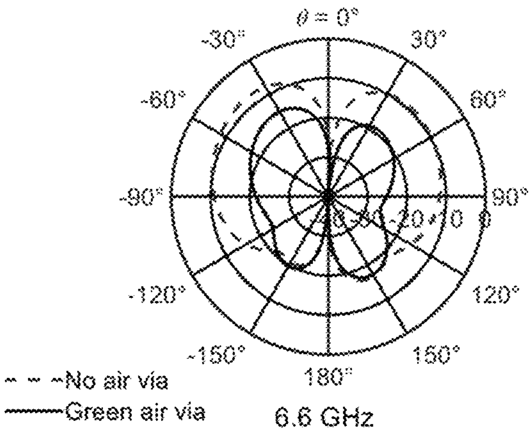

A comparison of the normalized H-plane cross-polarization level of Port 2 before and after introducing the third group 140 of air vias is given in FIGS. 16*a*-16*b*. A comparison is made between the cross-polarization level at 5.8 GHz in FIG. 18*a*, and the cross-polarization level at 6.6 GHz in FIG. 18*b*. For the case of "no air vias," the third group 140 of air vias are assumed as dielectric vias. Notably, the introduction of the third group 140 of air vias significantly reduces the H-plane (y-z-plane) cross polarization of Port 2.

It should be mentioned that, as in the case of the antenna in FIGS. 1*a*-1*b*, the third group 140 of air vias is, again, located at positions where the E-field of the $TE^{x,y}_{131}$ mode is strong. It is to prevent the excitation of the $TE^{x,y}_{131}$ mode. As a result, the dual-polarized design of the antenna 120 exhibits stable radiation patterns across its passband as found in the single-port design of the antenna in FIGS. 1*a*-1*b*.

A prototype (not shown) of the antenna 120 was fabricated with the following dimensions: a=32.5 mm, $w_g$=50 mm, $l_g$=50 mm, $l_{slot}$=9 mm, $w_{slot}$=5 mm, $l_{stub}$=4 mm, $w_{strip}$=2.7 mm, $d_{via}$=2 mm, $d_{cell}$=2.3 mm, $l_1$=7.8 mm, $w_1$=5.7 mm, $d_{via,2}$=1.2 mm, $d_{feed}$=12.85 mm, $d_{load}$=0.75 mm, $t_s$=1 mm, $\varepsilon_{rs}$=2.65, $t_f$=1 mm, $\varepsilon_{rf}$=2.65, $t_d$=4 mm, and $\varepsilon_{rd}$=10.2. Plastic screws were used to fix the DRA to obtain a reliable measurement. The simulated results of the actual implementation are used instead of the dielectric layer model.

Figure 19:
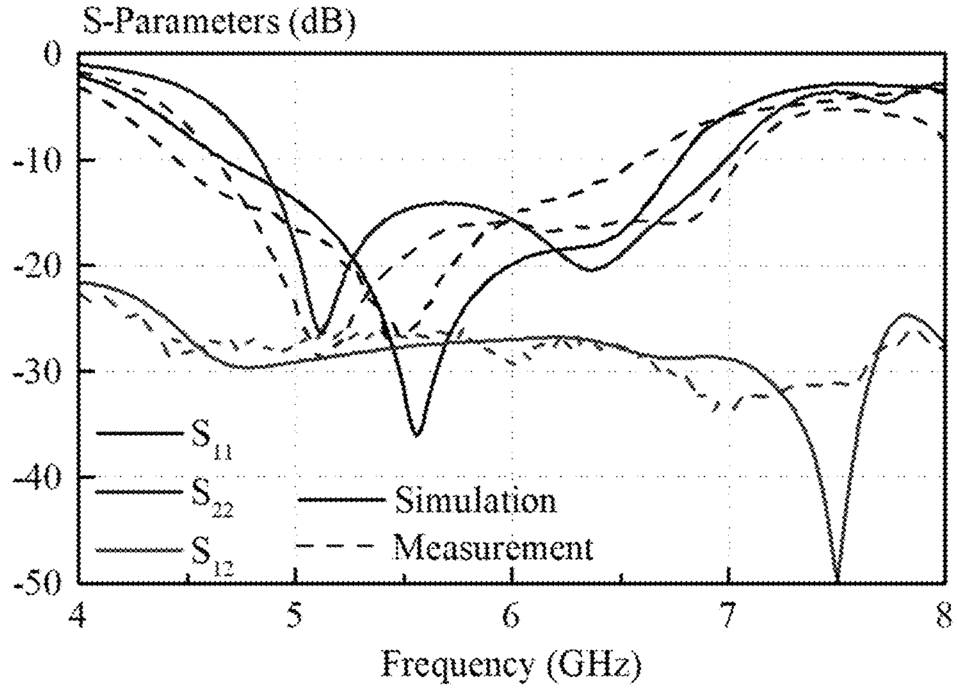
FIG. 19 shows measured (on a prototype) and simulated S-parameters of the antenna of FIG. 15.

The measured and simulated S-parameters of the prototype of the dual-polarized antenna are shown in FIG. 19. Good agreement between the measured and simulated results can be observed for both ports. Some discrepancies may arise from material and manufacturing tolerances of the DRA substrates and the antenna feeds, as well as small air gaps existing between the two 2 mm-thick DRA substrates.

Port 1 is matched across 4.45-6.6 and 4.67-6.78 GHz in the measurement and simulation, respectively. For port 2, it is matched across 4.64-7.06 and 4.83-6.99 GHz in the measurement and simulation, respectively. The measured and simulated overlapping bandwidths ($|S_{11,22}|<-10$ dB) of the two ports are 34.88% and 33.6%, respectively. Across the overlapping passband, both the measured and simulated isolations between the two ports are higher than 25 dB, which is high enough for practical applications.

Figure 20:
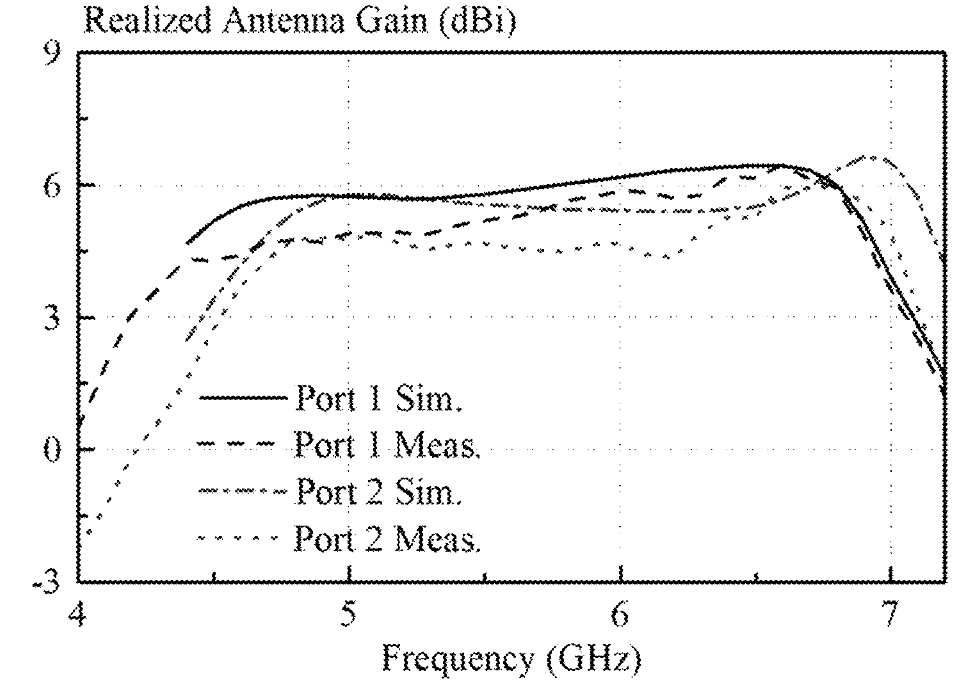
FIG. 20 shows measured (on a prototype) and simulated realized antenna gain of the antenna of FIG. 15.

In FIG. 20, the measured and simulated realized gains of the two ports are compared. As can be seen from the figure, a reasonable agreement between them is obtained. The discrepancies are due to experimental tolerances and cable losses. Port 1 has the maximum measured and simulated realized gains of 6.43 and 6.44 dBi, respectively. For port 2, the maximum measured and simulated realized gains are 5.96 and 6.62 dBi, respectively.

Figure 21:
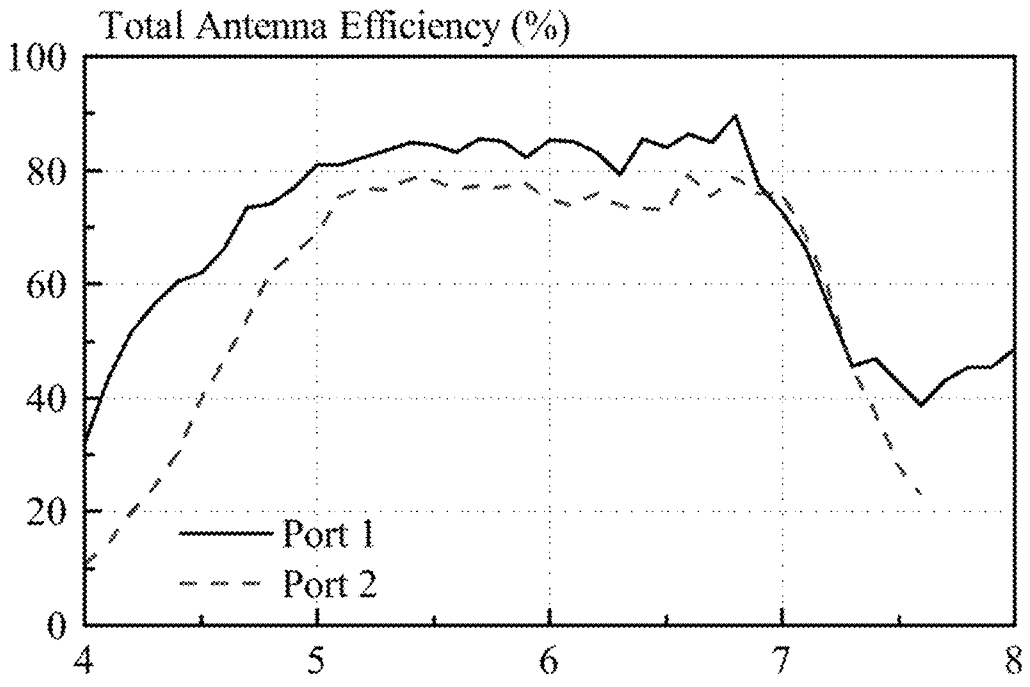
FIG. 21 shows measured total antenna efficiency of the prototype in FIG. 19 with mismatch included.
Figure 22A:
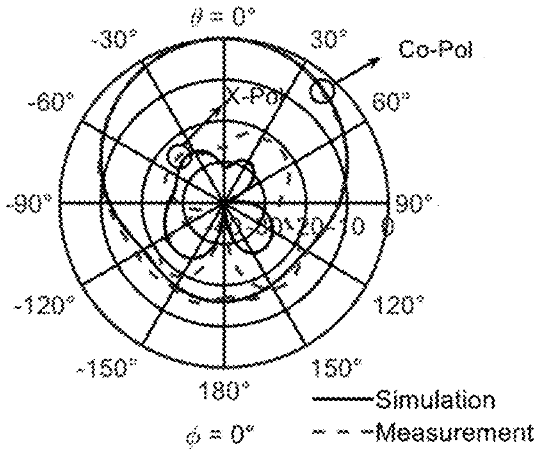
FIGS. 22*a* and 22*b* show measured (on a prototype) and simulated radiation patterns of the antenna in FIG. 15 at its port 1, at 5 GHz, when Φ=0° and Φ=900 respectively.
Figure 22B:
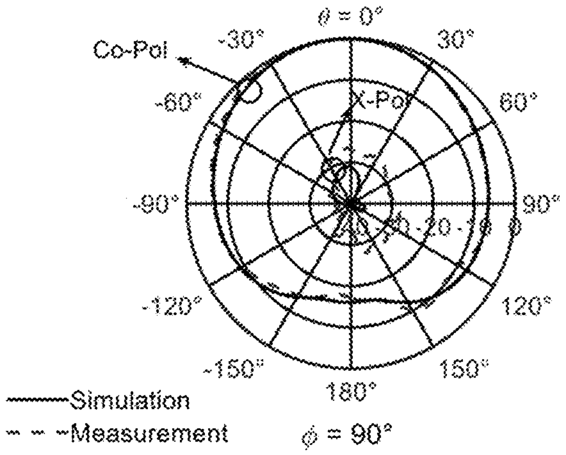
Figure 23A:
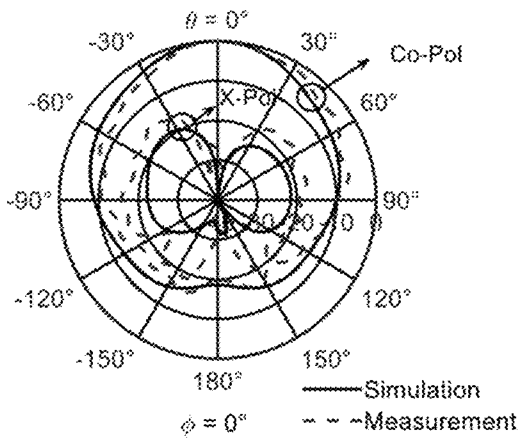
FIGS. 23*a* and 23*b* show measured (on a prototype) and simulated radiation patterns of the antenna in FIG. 15 at its port 1, at 6.6 GHz, when Φ=0° and Φ=900 respectively.
Figure 23B:
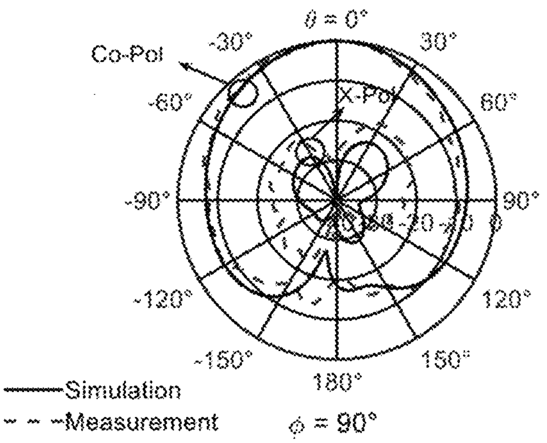
Figure 24A:
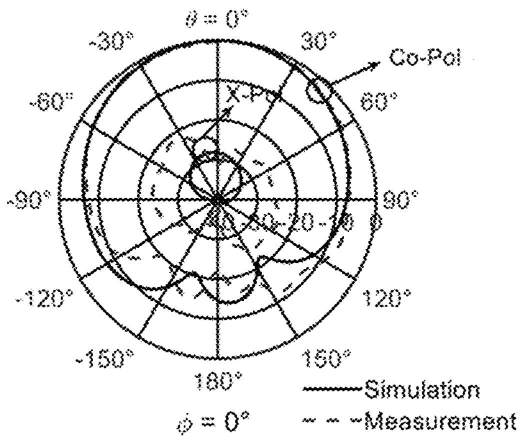
FIGS. 24*a* and 24*b* show measured (on a prototype) and simulated radiation patterns of the antenna in FIG. 15 at its port 2, at 5 GHz, when Φ=0° and Φ=900 respectively.
Figure 24B:
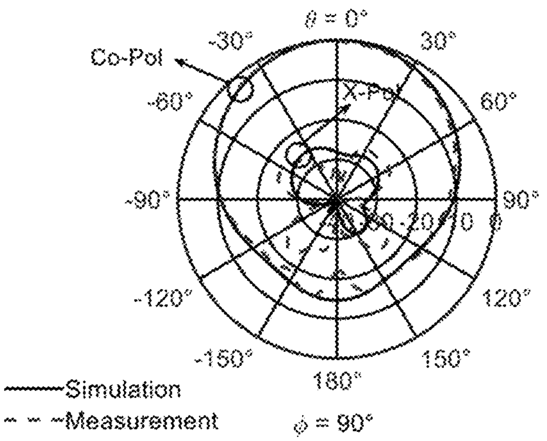
Figure 25A:
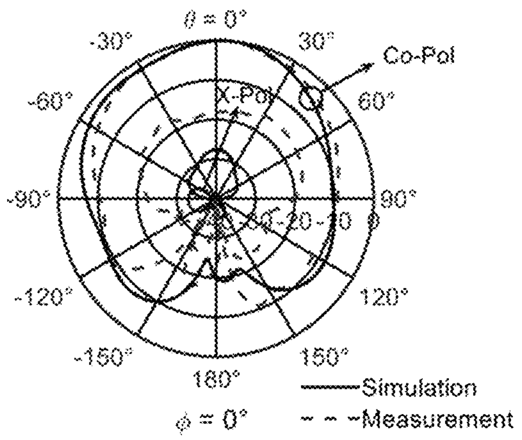
FIGS. 25*a* and 25*b* show measured (on a prototype) and simulated radiation patterns of the antenna in FIG. 15 at its port 2, at 6.6 GHz, when Φ=0° and Φ=900 respectively.
Figure 25B:
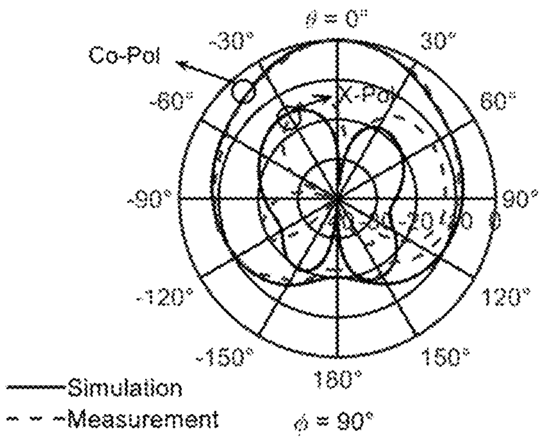

The measured total antenna efficiencies for both ports are shown in FIG. 21. For Port 1, a peak efficiency of 89% is achieved with an average efficiency of more than 82%. For Port 2, the peak efficiency is 79.1% with an average efficiency of more than 72%.

The measured and simulated radiation patterns at 5 and 6.6 GHz are shown in FIGS. 22*a*-22*b*, and FIGS. 23*a*-23*b* respectively for port 1. The measured and simulated radiation patterns at 5 and 6.6 GHz are shown in FIGS. 24*a*-24*b*, and FIGS. 25*a*-25*b* respectively for port 2. With reference to FIGS. 22*a*-25*b*, the measured results agree reasonably well with the simulated results. Stable broadside radiation patterns can be observed, with small front-to-back ratios across the entire antenna passband. The cross-polarization levels are generally lower than −10 dB.

A comparison between the antenna 120 and existing dual-polarized antennas is shown in Table II above. Since there are many dual-polarized wideband designs, this list is by no means complete. Instead, it focuses on the reported low-profile antennas. It was found that most of the previously reported dual-polarized wideband antennas have either suspended crossed dipoles or suspended patch antennas [17]-[21]. All of these antennas typically share some of the following features. The designs employ more complex feeding schemes, such as differential feeding, or require baluns and phase shifters to obtain dual-polarized operation. In contrast, the design of the antenna 120 has a simple feeding scheme, yet providing high isolation between the two ports. Furthermore, patch or crossed-dipole antennas need to be located at a distance above the ground plane, i.e., a rather large air gap exists between the ground plane and radiator. Therefore, most of these designs exhibit a relatively higher profile compared to our dual-polarized DRA. Although PCB can be employed in many of those designs, their assembly is more delicate than the antenna 120 because the radiator and/or other components are placed at a distance above the ground plane. Some of the designs exhibit lower cross-polarization levels. This is not surprising because many of the designs employ a differential feed or a balun to feed the antenna. The design of the antenna 120, however, has a very simple feed design without the need for any additional circuitry to operate the antenna. Finally, many of the designs employ non-PCB components to guarantee good performance, which can lead to additional costs and difficulty in the fabrication.

One can see that the antenna 120 can be manufactured using standard PCB materials and does not require any additional circuitry for dual port operation. The antenna 120 can achieve a bandwidth of more than 34.8%, while maintaining a low profile of $0.094\lambda_0$. Furthermore, the antenna 120 is planar and does not need to be suspended above a ground plane.

The design guideline for antenna 120 is based on that of the antenna in FIGS. 1*a*-1*b* as mentioned previously. As the first step, the antenna in FIGS. 1*a*-1*b* should be designed, and based on this result, the antenna 120 can be obtained.

1) The second group air via sections of the antenna in FIGS. 1*a*-1*b* are rotated by 90°. The second group air via sections are reduced in length to approximately $0.17\lambda_0$ (or four unit cells of vias) and offset from the edge of the DRA by $0.086\lambda_0$ (or two unit cells).
2) Next, the third group of air vias can be added. Their sections are combined in combination with the second group air via sections to obtain the shape of a square ring in FIG. 15.
3) The first group air via sections can be added next. They are placed at the center of each edge region of the DRA with both the width and length given by $0.086\lambda_0$ (or two unit cells).
4) After the DRA is obtained, its structure and the two feeding ports are tuned. Dielectric vias can be loaded into the Port-2 feeding substrate in order to increase the overlapping bandwidth and shift the Port-2 resonance frequencies downward.

The exemplary embodiments are thus fully described. Although the description referred to particular embodi-

TABLE II

COMPARISON BETWEEN THIS WORK AND OTHER DUAL PORT ANTENNAS

| Ref. | Impedance BW (exp.) (%) | Isolation (dB) | Antenna size ($\lambda_0^3$) | Antenna structure | Feed network | Cross-polarization level (dB) | Fully PCB-compatible |
|---|---|---|---|---|---|---|---|
| [17] | 45.45 | 38 | 1.46 × 1.46 × 0.146 | Suspended patch antenna with metallic walls and slotted ground | Balun, U-shaped probe | <−18 | No |
| [18] | 28.7 | 20 | 0.76 × 0.76 × 0.37 | Crossed printed dipole | Balun | <−15 | Yes |
| [19] | 18.43 | 30 | 0.36 × 0.36 × 0.0857 | Microstrip patch antenna and suspended parasitic patch antenna | Direct feed | <−20 | Yes |
| [20] | 22.7 | 35 | 0.455 × 0.455 × 0.173 | Suspended crossed dipole | Balun | <−30 | Yes |
| [21] | 32.7 | 25 | 0.487 × 0.487 × 0.105 | Suspended crossed dipole with suspended metasurface | Gamma shaped probe | <−26 | No |
| This work | 34.88 | 25.76 | 0.609 × 0.609 × 0.094 | DRA | Slot, microstrip feed | <−12 | Yes |

$\lambda_0$: Wavelength at the center frequency of the passband.

ments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the preferred embodiments mentioned above, the dielectric resonator contains dielectric vias and air vias. However, one should understand that the air vias are just examples of possible implementations of the invention. From an electromagnetics point of view the material inside the air vias is not limited to only air, as there are many other choices. More specifically, air in the air vias can be replaced with any material in other variations of the inventions, provided that the dielectric constant of the material is sufficiently lower than the dielectric constant of the first substrate (e.g. first substrate 22 in FIG. 1). Therefore, all solid, gaseous and liquid materials can be used, provided that the dielectric constant of the material is sufficiently small (say 1-3, if the dielectric constant of the first substrate is 10.2). In comparison, the dielectric vias in the dielectric resonator are filled with a material with higher dielectric constant than the first substrate's dielectric constant.

In the embodiments described, three groups of air vias are arranged in the DRA structure in certain patterns substrate as shown in FIGS. 1*a* and 15. The invention is however not limited by the choice of the location of the air vias. In other examples of the design technique, the air vias are placed at different positions. In yet another example of the invention, the air vias are filled with a material with a third dielectric constant with its dielectric constant being larger or smaller than the first dielectric constant of the DRA substrate. Furthermore, the invention it is not limited to the choice of the lattice of the perforations. In one implementation the holes are arranged in a square lattice. In another implementation they are arranged in a rectangular or triangular grid. In yet another implementation the holes are arranged in a random manner with no particular order. Furthermore, the invention is not limited by the choice of the shape of the perforations. In the embodiments described above, the perforations are cylindrical, whereas in other examples other shapes, such as elliptical, square, etc. are used.

Likewise, the invention is not limited by the number of air vias or by the position of the air vias. In other implementations of the invention, the air via structures are arranged in a different manner, such that electromagnetic control of the DRA is achieved.

In some implementations described above, the second dielectric constant of the dielectric materials in the dielectric vias is 20, and the first dielectric constant of the DRA substrate is 10.2. The invention is not limited by the choice of the substrate with a first dielectric constant. The invention is also not limited by the choice of the material constituting the dielectric vias with a second dielectric constant, nor is it limited by the choice of the material with the third dielectric constant. Those skilled in the art should understand that different dielectric materials with different dielectric constants can be chosen for the substrate(s) and the via(s), as long as they can be proceeded by standard PCB manufacturing processes. In general, low dielectric constant substrates with dielectric constants of ~2-3 are preferred for the support and feeding substrate. However, it is not a necessity and other substrates, with higher dielectric constants can be used instead.

The first microstrip feedline and the second microstrip feedline in FIGS. 1 and 15 are shown with certain shapes. One should understand that the invention is not limited by these shapes of the feedlines. Rather, microstrip feedlines of other shapes can also be configured in the antennas. The invention is furthermore not limited by the excitation method of the DRA, i.e., slot feed, conformal feed, probe feed or any other suitable method can be used.

In the embodiments described above, a number of holes are implemented as dielectric vias, whereas other holes serve the function of air vias. The holes have a diameter of $d_{via}$ and are placed in square lattice with periodicity $d_{cell}$. In particular, a 14×14 grid of via hole is employed in the antennas shown in FIGS. 1*a* and 15. In other examples, different via grids are employed. For instance, in another example of the invention, an 18×18 grid, a 14×18 grid or any other number of via holes along the two horizontal dimensions of the DRA substrate can be employed. Furthermore, the invention is not limited by the shape of the PCB substrate hosting the dielectric and air vias. In another implementation the substrate is chosen to be of rectangular shape. In yet another implementation the DRA substrate can be of cylindrical or elliptical shape.

Regarding dual-polarized antennas, the invention is not limited by the choice of the size and position of the dielectric filled perforated holes in the second port feeding network of the antenna. In other implementations the position of the vias may vary. In yet another implementation the vias are placed outside of the metal part of the feeding network. It is also understood by anyone familiar with the art of antenna design, that other excitation schemes for the antenna can be used and the structure is only one example of the design idea.

It should be noted that although in preferred embodiments mentioned above, air is used to fill into the air vias in the dielectric resonator, the invention is not limited to the use of air (e.g. that from atmosphere). Rather, a different gas including different gas mixtures can be used to fill the air vias, and air is only one example that is used to explain the invention. As skilled persons understand, when air is mentioned it means a mixture of nitrogen, oxygen, and minute amounts of other gases that surrounds the earth and forms its atmosphere. When there is a need, the air vias can also be encapsulated to prevent the gap from leaking from the air vias.

What is claimed is:

1. A dielectric resonator antenna, comprising:

a) a substrate-integrated dielectric resonator, which comprises i) a first substrate layer with a first dielectric constant;

ii) a plurality of first vias each having a first via-hole extending through the first substrate layer, and a first dielectric material with a second dielectric constant contained within the first via-hole; and iii) a plurality of second vias each having a second via-hole extending through the first substrate layer and filled with a second dielectric material with a third dielectric constant;

b) a third substrate layer arranged on one side of a first substrate layer of the substrate-integrated dielectric resonator; the third substrate layer further comprising
i) a first microstrip feedline; and
ii) an antenna ground plane;

c) a second substrate layer interposed between the first substrate layer and the third substrate layer; the second substrate layer further comprising a second microstrip feedline; the first microstrip feedline and the second microstrip feedline configured as two feeding ports of the dielectric resonator antenna; wherein the second microstrip feedline is configured with a plurality of first dielectric vias therethrough.

2. The dielectric resonator antenna of claim 1, wherein at least one of the third substrate layer and the second substrate layer has a fourth dielectric constant which is smaller than a first dielectric constant of the first substrate layer of the substrate-integrated dielectric resonator.

3. The dielectric resonator antenna of claim 1, wherein the third substrate layer further comprises a coupling slot that has a longitudinal direction intersecting with that of the first microstrip feedline.

4. The dielectric resonator antenna of claim 3, wherein the third substrate layer further comprises a plurality of second feeding vias which are mirrored from the plurality of first feeding vias about a center of the third substrate layer; the plurality of second feeding vias located outside of the second microstrip feedline.

5. The dielectric resonator antenna of claim 1, wherein the plurality of first vias and the plurality of second vias as a whole are distributed substantially across an entire area of the first substrate layer.

6. The dielectric resonator antenna of claim 1, wherein the plurality of the first vias and the plurality of the second vias are distributed equidistantly from each other, and all the first vias and the second vias have the same diameter.

7. The dielectric resonator antenna of claim 1, wherein the plurality of the first vias and the plurality of the second vias are arranged in a square lattice, a rectangular lattice, a triangular lattice or in a random manner.

8. The dielectric resonator antenna of claim 1, wherein the plurality of second vias comprises at least one of the followings: a group of said second vias for controlling an input impedance of the substrate-integrated dielectric resonator; a group of said second vias for enhancing an input bandwidth of the substrate-integrated dielectric resonator; and a group of said second vias for moving an undesired resonator mode out of a passband of the substrate-integrated dielectric resonator.

9. The dielectric resonator antenna of claim 1, wherein the second dielectric constant is larger than the first dielectric constant.

10. The dielectric resonator antenna of claim 1, wherein the third dielectric constant is smaller than the first dielectric constant.

11. The dielectric resonator antenna of claim 10, wherein the third dielectric constant is in the range of 1 to 3.

12. The dielectric resonator antenna of claim 1, wherein the second dielectric constant is equal to or smaller than 20.

13. The dielectric resonator antenna of claim 1, wherein the first dielectric constant is equal to or smaller than 10.2.

14. The dielectric resonator antenna of claim 1, wherein the plurality of second vias comprises two parallel rows of said second vias, each of the two parallel rows having two or more said second vias.

15. A method of fabricating a dielectric resonator, comprising the steps:

a) providing a substrate-integrated dielectric resonator, which comprises:
i) providing a first substrate layer with a first dielectric constant;
ii) forming a plurality of first vias on the first substrate layer; each said first vias having a via-hole extending through the first substrate layer, and a first dielectric material with a second dielectric constant contained within the first via-hole; and
iii controlling a resonator mode of the substrate-integrated dielectric resonator by forming a plurality of second vias in the substrate-integrated dielectric resonator; each said second via having a second via-hole extending through the first substrate layer and filled with a second dielectric material of a third dielectric constant;

b) providing a third substrate layer arranged on one side of a first substrate layer of the substrate-integrated dielectric resonator; the third substrate layer further comprising a first microstrip feedline and an antenna ground plane;

c) providing a second substrate layer interposed between the first substrate layer and the third substrate layer; the second substrate layer further comprising a second microstrip feedline; the first microstrip feedline and the second microstrip feedline configured as two feeding ports of the dielectric resonator antenna; wherein the second microstrip feedline is configured with a plurality of first dielectric vias therethrough.

* * * * *